United States Patent [19]

Wagner et al.

[11] 4,155,248
[45] May 22, 1979

[54] METHOD AND APPARATUS FOR DETERMINING THE PRESSURE DROP AND CIRCUMFERENCE OF FILTER RODS

[75] Inventors: John R. Wagner, Greensboro, N.C.; James R. Knighton, Mary Ester, Fla.; Werner P. Kirschstein, Greensboro, N.C.

[73] Assignee: Lorillard—A Division of Loew's Theatres, Inc., New York, N.Y.

[21] Appl. No.: 922,570

[22] Filed: Jul. 7, 1978

[51] Int. Cl.² ............................................. G01M 3/26
[52] U.S. Cl. ......................................... 73/38; 73/37.7
[58] Field of Search .................. 73/38, 37.5, 37.7, 40, 73/41, 45, 43.1, 45.2, 37, 40.5 A, 4 R

[56] References Cited

U.S. PATENT DOCUMENTS

| | | | |
|---|---|---|---|
| 3,585,844 | 6/1971 | Dorneiffer | 73/37.7 |
| 3,991,605 | 11/1976 | Reuland | 73/38 |

Primary Examiner—Donald O. Woodiel
Attorney, Agent, or Firm—Brumbaugh, Graves, Donohue & Raymond

[57] ABSTRACT

The pressure drop through and the circumference of filter rods for cigarette filters or the like are determined by a completely automated rod test station that consists of a measuring unit and a computer. The measuring unit has a transport system for rapidly moving a filter rod first into a pressure drop gauge and next into a pneumatic circumference gauge and then ejecting it. A single pressure transducer in the measuring unit detects the pressure drops across the standard, through the filter rod in the pressure drop gauge and through the annular passage between the rod and die in the circumference gauge. The analog electrical signals produced by the transducer are converted to digital signals which are input to a computer. The computer corrects the measured signals indicative of pressure drop in accordance with any error detected between the measured drop across the calibration standard and a stored internal constant representing the calibrated pressure drop for the standard during each test sequence. The computer also stores the calibration information for the circumference gauge and computes the circumference. The computer outputs are available for digital display or any other desired use. The computer also controls the operating cycle of the measuring unit.

15 Claims, 6 Drawing Figures

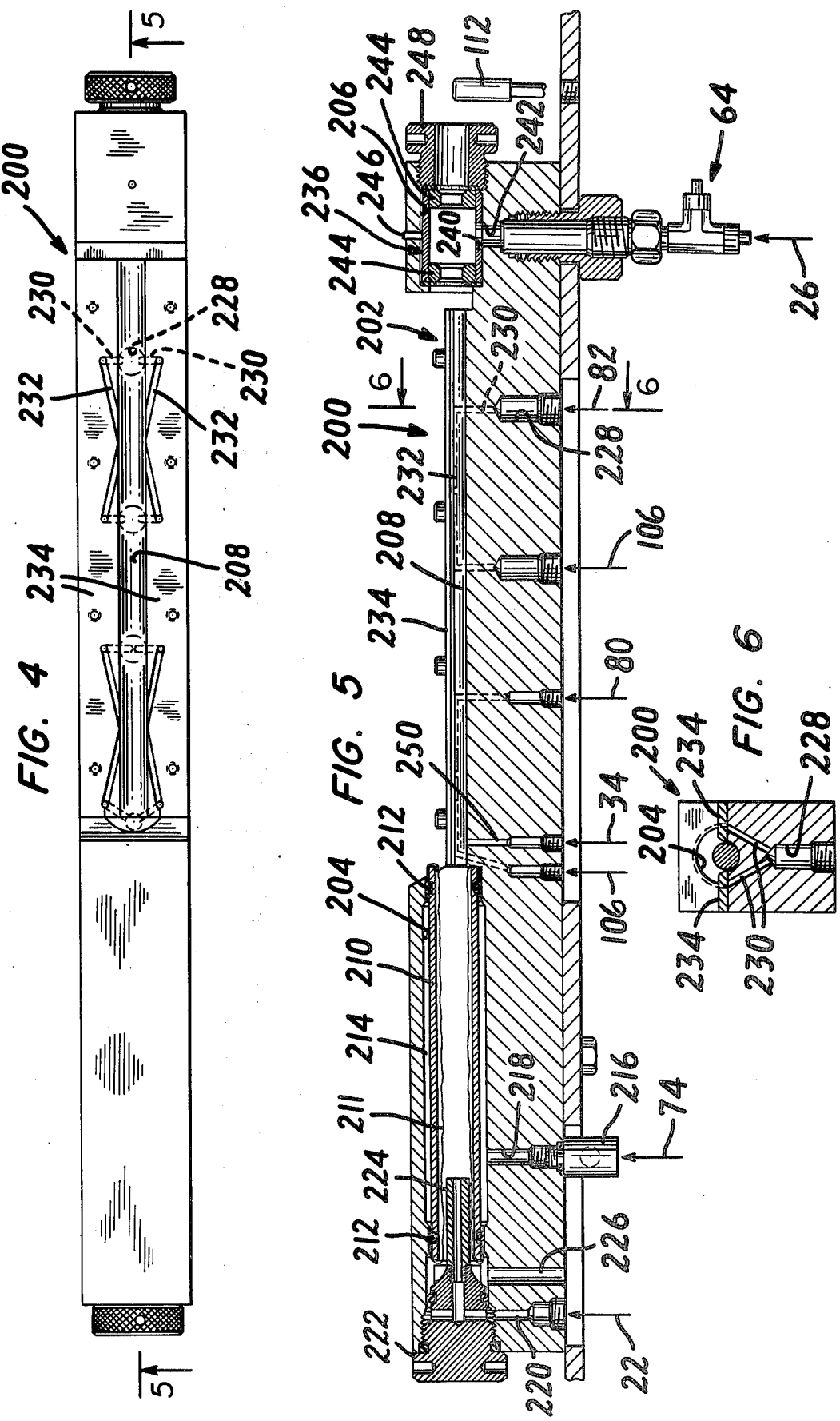

METHOD AND APPARATUS FOR DETERMINING THE PRESSURE DROP AND CIRCUMFERENCE OF FILTER RODS

BACKGROUND OF THE INVENTION

In the cigarette industry, modern manufacturing techniques have increased production speeds to the point that manual quality control methods are no longer adequate. One area in which this problem exists is in filter rod manufacturing. The filter tip on the common filter-tipped cigarette is actually a short segment of a longer (e.g. 100 mm.) filter rod which is cut into pieces in the final stages of the manufacture of the cigarette. One rod normally provides filter tips for up to six cigarettes. These filter rods are manufactured on high-speed filter-making machines at a rate of up to 4,000 per minute per machine.

In the filter rod manufacturing process, the manufacturing parameters which must be under closest quality control are the pressure drop and circumference. These two parameters are highly interdependent, and often repeated adjustment of the filter-making machine is required before the manufactured rods can meet specifications.

Pressure drop may be thought of as the resistance to flow of the gas stream through the filter, and it affects both the "draw" of the cigarette and the tar and nicotine removal efficiency of the filter. Circumference is important because manufacturing uniformity must be maintained in the cigarette product (the tip will be attached to a tobacco rod of controlled circumference) and because of its effect on pressure drop. If the material is packed tightly into a smaller circumference rod, the result will be an increase in the pressure drop.

Previously, the method for ascertaining quality in filter rod manufacturing was as follows: a quality control technician manually sampled the production of each filter-making machine and carried the samples to a manual measuring device. This measuring process took as much as ten minutes to perform, during which time as many as 240,000 individual filters could be manufactured on each machine. If a filter-making machine needed adjustment during this period, many hundreds of dollars of production could be wasted.

In the past several years, both cigarette manufacturers and filter material suppliers have made attempts to produce an automatic rod test method. Improvement in measurement and material handling techniques have been successfully made, but effective computer implementation has not, as far as is known, been achieved prior to the present invention.

Some of the improvements referred to above are contained in U.S. Patent and Trademark Office Public Disclosure No. T938010 which describes and shows a partially automated rod test station. Although the unit as described in that publication is automated insofar as automatically transporting the filter rod through the test sequence, thus reducing the time required to handle the rod, the pressure drops in the pressure drop gauge and circumference gauge are detected by manometers which are inherently sensitive to temperature and barometric pressure changes and to human error in reading the gauges. Although precision components may be used in the vacuum system for the pressure drop gauge and pressure system for the circumference gauge, such systems nonetheless require frequent calibration and like the manometers are subject to drift as ambient conditions may change.

SUMMARY OF THE INVENTION

There is provided in accordance with the present invention a completely automated rod test station which consists of a measuring unit and a computer. All operations of the measuring unit are controlled by the computer, and the analog electrical signals indicative of the pressure drop and circumference generated in the measuring unit are converted to digital signals which are processed in the computer into outputs suitable for direct display of engineering values or for any other desired use.

The pressure drop gauge, circumference gauge and pneumatic filter rod transport are integral parts of a small, self-contained gauge and transport assembly and are similar to the gauges and transport of the equipment described and shown in the above-mentioned Publication No. T938010. However, the pressure drop gauge in the rod test station, according to the present invention, operates by conducting gas under pressure at a predetermined constant flow rate through the filter rod, rather than pulling air through the filter rod by a vacuum.

Among the important aspects of the present invention is the provision in the measuring unit of a built-in calibration standard which provides for calibration of the unit in the course of every test sequence. That unit also detects all measured pressures, i.e., the pressure drops across the calibration standard, the pressure drop gauge and the circumference gauge, by means of a single pressure transducer. The provision of an internal standard which is read during each test and the use of a single pressure transducer for measuring all pressure drops makes the equipment highly accurate. The processing of the pressure drop measurements in digital form also contributes to the accuracy of the test station by eliminating the inaccuracies inherent in mechanical gauges and analog electrical processing systems.

For a better understanding of the invention, reference may be made to the following description of an exemplary embodiment, taken in conjunction with the figures of the accompanying drawings and with the description of the computer software contained in Appendix A annexed hereto.

DESCRIPTION OF THE DRAWINGS

FIG. 4 is a top view (except that certain parts are omitted) of a gauge and transport assembly which is essentially the same as the one shown schematically in FIG. 1 but includes some modifications;

FIG. 5 is a side cross-sectional view of the assembly of FIG. 4 taken along the lines 5—5 of FIG. 4 and in the direction of the arrows; and FIG. 6 is an end cross-sectional view of the assembly of FIG. 4 taken along the lines 6—6 of FIG. 4 and in the direction of the arrows.

DESCRIPTION OF EXEMPLARY EMBODIMENT

The Measuring Unit

Figure 1:
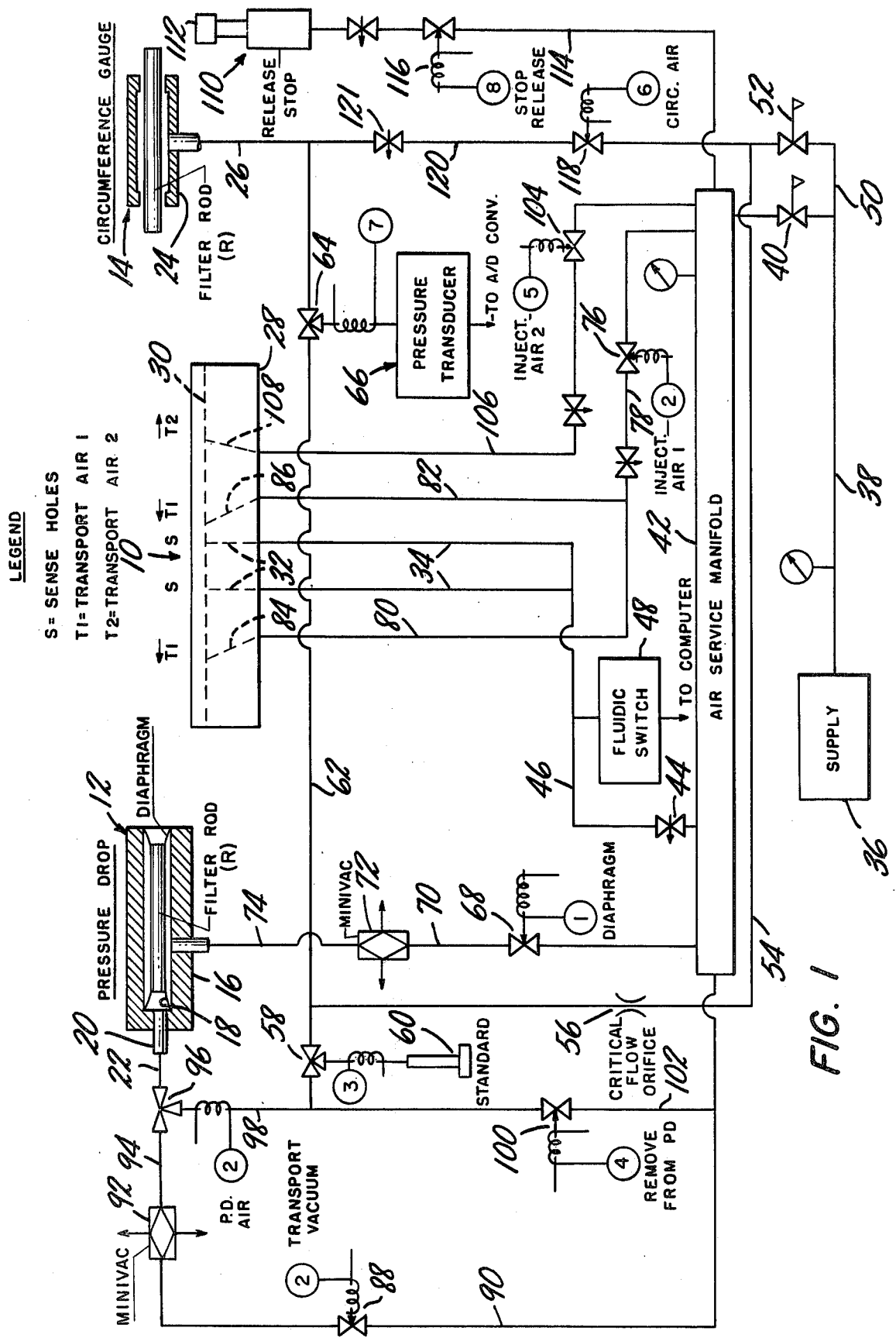
FIG. 1 consists of a diagram of the pneumatic circuits of the measuring unit and schematic representations of the transport system, pressure drop gauge and circumference gauge.

As mentioned previously, the transport system, which is designated by the reference numeral 10 in FIG. 1, the pressure drop gauge 12 and the circumference gauge 14 of the measuring unit are parts of a small gauge and transport assembly. For clarity they are depicted separately in FIG. 1, though they are in fact joined into a single unit or assembly (see FIGS. 4 to 6). The pressure drop gauge and circumference gauge are well-known, at least in principle, by reason of their widespread use in state-of-the-art rod test units, but certain improvements are included in the gauge according to the invention.

The pressure drop gauge consists of a cylinder 16 and a rubber diaphragm 18 which, when relaxed, fits tightly over the length of a filter rod sample R. The cylinder 16 is open at one end (the right end in FIG. 1) for reception and ejection of the rod sample and is closed at the other end except for a tube 20 for connecting a pneumatic line 22 to the chamber within the diaphragm 18.

The circumference gauge 14 uses the principles of air gauging and consists of a die 24 having an internal circumference that is slightly greater than the circumference of the rod sample R to be measured. A gas, preferably air, is delivered at a substantially constant pressure into the die and flows out through annular passages between the rod sample R and the die 24. The rate of air flow out through the annular passages is a function of the circumference of the sample R; the pressure build up in the line 26 to the gauge, in turn, is a function of the rate of air outflow. As is well known, the circumference gauge is calibrated by inserting several standard rods having a desired range of diameters to generate a calibration curve of the relationship between diameter and the gas pressure upstream from the passage.

The transport system 10 includes a metal or plastic section 28 having a longitudinal semi-circular groove 30 in which a filter rod will nest and along which it will freely move and by which it will be guided along a path coincident with its axis. The section 28, pressure drop gauge 12 and the circumference gauge 14 are positioned to align the axis of a rod received in the groove 30 with the axes of the diaphragm 18 of the pressure drop gauge and the die 24 of the circumference gauge.

In the transport 10 of FIG. 1, the section 28 has two small holes 32 which are connected to pneumatic lines 34. Gas under pressure from a supply 36 (which may be the factory air supply, preferably filtered) is selectively conducted through a line 38, a regulator 40, which controls the pressure of air in a main air service manifold 42, across a needle valve 44 and through a line 46 and the lines 34 through the holes 32. The air leaves the holes 32 as small, relatively low-pressure jets through openings from the holes into the groove 30. When a rod sample R is deposited in the groove 30, the pressure in the lines 34 and 46 increases. The increase in pressure is detected by a fluidic switch 48 connected to the line 46 which closes and conducts an electrical signal to the computer. A signal indicative of the presence of a rod sample on the transport 10 initiates a test cycle, as is described in more detail below.

An alternative sensing concept, which has some advantages over the one just described, is described below and shown in FIGS. 4 to 6. According to that alternative concept, a signal from the computer generated on a timed basis, say once a minute, starts the test cycle by triggering the ejection of a rod sample from the rod making machine. A pneumatic ejector and delivery trough automatically deliver the rod samples to the transport 10, and the transport 10 feeds the sample into the pressure drop gauge. The test cycle proceeds further only when a sensor detects the sample in proper position in the pressure drop gauge.

Figure 2:
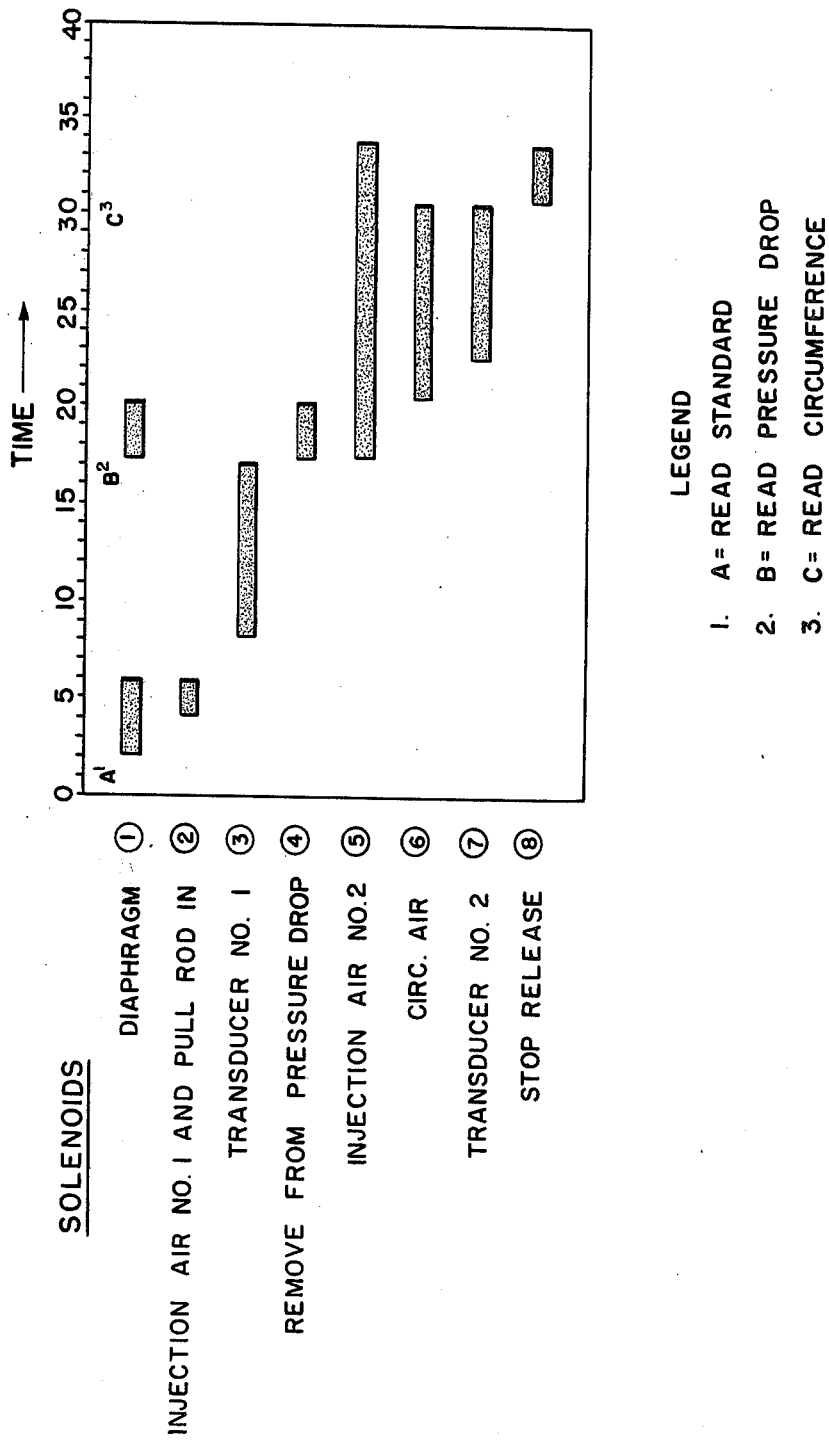
FIG. 2 is a timing diagram illustrating the sequence of operation of the measuring unit.

As described in greater detail in the subsection of this specification entitled "The Computer," all of the operations of the measuring unit are controlled by the computer. In particular, signals from the computer control the openings and closings of the various solenoid valves in the pneumatic system of the measuring unit. In FIG. 1, each solenoid valve is identified by a number in a circle which corresponds to the number in the circle to the left of the timing diagram (FIG. 2). The legends at the left of the diagram identify the operations of a test cycle that result from computer-generated output control signals at the time ticks indicated along the top of the diagram.

At the beginning of a cycle of operation of the measuring unit all of the two-way solenoid valves are closed, and the only air flows (or essentially non-flowing static communication) occurring in the pneumatic circuit are as follows:

(1) flow from the manifold 42 through the lines 46 and 34, i.e., the sensing air, as described above;
(2) flow from the supply 36 through the line 38, a line 50, a precision regulator 52, a line 54, a critical flow orifice 56 and through a three-way valve 58 (code No. 3) to an internal calibration standard 60; and
(3) communication through a line 62 which is connected between the three-way valve 58 (Code No. 3) and a three-way valve 64 (Code No. 7) to a pressure transducer 66.

The status of the measuring unit is as described above at all times in the operation of the equipment other than in the course of a test cycle. In that status, sensing air is present to detect reception of a rod sample, air is delivered at a substantially constant flow rate, as established by the critical flow orifice 56 in the line 54, to the calibration standard, and the pressure at the calibration standard is continuously monitored by the pressure transducer 66.

As indicated in the timing diagram (FIG. 2), the first step in a test cycle is the reading of the calibration standard (as represented by the letter A at time tick one in the diagram). The calibration standard is, quite simply, a calibrated orifice which provides a known pressure drop at a given flow rate. In the test station, the flow rate applicable in the measurement of pressure drop in the pressure drop gauge 12 is 17.5 cc/sec., the industry standard. Various changes from the standard conditions for which the standard is calibrated that may produce drift in various parts of the measuring unit, for example, changes in ambient barometric pressure and temperature, will also produce a change in the pressure drop through the standard, will be reflected in the pressure in the line 62 and will, in turn, be detected by the pressure transducer and be reflected in the analog signal generated by the transducer. (The processing of the analog electrical signals from the pressure transducer is described below in the section headed "The Computer.")

At time tick two, under control of the computer (as is the case with all operations depicted in the timing diagram), a two-way solenoid valve 68 (Code No. 1) in a line 70 leading from the air service manifold 42 is opened, and operating air is delivered through the line 70 to a commercially available venturi-type vacuum generating device 72 (called a "MINIVAC"), thereby producing a vacuum in a line 74 that is connected to the annular space between the diaphragm 18 and the cylinder 16 of the pressure drop gauge. That vacuum sucks the diaphragm radially outward to open up the chamber within it for reception of a rod sample R. At time tick four, a two-way solenoid valve 76 (Code No. 2) in a line 78 opens to connect the air service manifold 42 to lines 80 and 82 which deliver air under pressure through holes 84 and 86 in the transport section 28. The holes open to slots which are milled horizontally on each side of the groove 30 and at an angle to the longitudinal axis of the groove (please see FIGS. 4 and 5 and the description below). The slots associated with the holes 84 and 86 are oriented toward the pressure drop gauge and deliver jets of air which the rod sample along the transport groove and into the pressure drop gauge. At the same time, a two-way solenoid valve 88 (also Code No. 2) in a line 90 leading from the manifold 42 opens to supply air under pressure to a second "MINIVAC" 92, thereby to produce a vacuum in a line 94 that is connected through a three-way solenoid valve 96 (Code No. 2) to the line 20 and thus to the closed end of the pressure drop gauge 12. When the valve 96 is not energized, it connects the line 22 to a line 98. Energization at time tick four shifts the valve to open communication between the lines 22 and 94 and produces a vacuum in the closed end of the pressure drop gauge. This ensures that the sample rod will not produce a "piston action" in the pressure drop gauge but will be fully received within the diaphragm. (An alternative, and preferred, way of preventing the "piston action" is shown in FIGS. 4 to 6 and is described below.)

At time tick six, the Code No. 2 valves 76, 96 and 88 are de-energized, thereby to terminate delivery of transport air through the holes 84 and 86, restore communication between lines 22 and 98 and shut off the vacuum in line 94. At the same time (tick six) the valve 68 (Code No. 1) closes to deactivate the vacuum generator 72, thereby permitting the diaphragm to close and seal the circumferential surface of the rod sample R just inserted into the gauge 12.

At time tick eight, the three-way solenoid valve 58 (Code No. 3) is energized to close the connection from line 54 to the standard 60 and shift the valve to connect the measuring air supply (line 54) to the line 98, thus to supply measuring air via the valve 96 and line 22 to the pressure drop gauge. The air passes through the filter rod at a constant flow rate, and the pressure drop through the filter rod becomes manifested in an increase in pressure in the line 62 (and that part of the line 54 downstream of the critical flow orifice 56). A critical flow orifice inherently produces a constant flow rate, regardless of pressure changes downstream, provided the upstream pressure is at least twice the downstream pressure. After a period of time for stabilization of the flow conditions in the pneumatic circuit at a constant flow rate, the pressure transducer 66 is read, as indicated by the letter B in the timing diagram, at time tick 16.

At time tick 17, the following events occur:
(1) the diaphragm 18 is retracted to release the rod sample R by again opening the solenoid valve 68 (Code No. 1) to activate the "MINIVAC" 72;
(2) the valve 58 is shifted to disconnect the measuring air from the pressure drop gauge and restore the connection to the standard 60;
(3) a two-way solenoid valve 100 (Code No. 4) in a line 102 opens to connect the manifold 42 to the closed end of the pressure drop gauge to supply air under pressure and eject the rod from the gauge chamber to the transport;
(4) a two-way solenoid valve 104 (Code No. 5) in a line 106 connects the manifold 42 to transport slots 108 that are oriented to deliver small air jets generally along the axis of the transport groove toward the circumference gauge 14.

In short, the above-described events at time tick 17 release the rod sample from the pressure drop gauge and transport it into the circumference gauge 14. The injection or transport jets from the slots 108 remain on for the remainder of the test cycle and hold the sample in engagement with a stop 110. The stop 110 consists of a movable stop element 112 which is associated with a small pneumatic actuator and is normally held in an upward position (in which it engages the downstream end of the rod sample) by a spring but can be moved down to release the rod by delivering air to the actuator from the manifold 42 through a line 114 via a two-way solenoid valve 116 (Code No. 8) which opens when the solenoid is energized.

At time tick 20, the valve 68 (Code No. 1) is again closed to turn off the vacuum in line 74 and relax the diaphragm of the pressure drop gauge, and the valve 100 (Code No. 4) is also closed to turn off the supply of transport air through the lines 102, 98 and 22 to the pressure drop gauge.

Also at time tick 20, a two-way solenoid valve 118 (Code No. 6) in a line 120 is opened to supply measurement air to the supply line 26 of the circumference gauge. A needle valve 121 reduces the pressure established by the regulator 52 to the operating range of the gauge. Two ticks later, the valve 64 (Code No. 7) is shifted to disconnect the pressure transducer 66 from the line 62 (and thus from the standard) and connect it to the line 26, i.e., to the circumference gauge 14. After a delay time for stabilization, the pressure transducer 66 is again read, as indicated by the letter C in FIG. 2 (time tick 29).

The operating cycle of the gauge and transport unit concludes with the following steps:
(1) at time tick 30, the valve 118 (Code No. 6) is closed to terminate the supply of air to the circumference gauge, the valve 64 (Code No. 7) is de-energized to disconnect the transducer 66 from the circumference gauge and reconnect it to the standard via line 62, and the valve 116 (Code No. 8) is opened to activate the actuator of the stop 110 and lower the stop element 112 from engagement with the end of the rod sample, whereupon the jets of transport air from the slots 108 ejects the rod sample from the circumference gauge;
(2) at time tick 33, the valve 104 (Code No. 5) is closed to shut off the supply of transport air through the slots 108, and the valve 116 (Code No. 8) is closed to allow the spring to restore the stop element 112 to the up position in alignment with the axis of the circumference gauge 114.

The Computer

Figure 3:
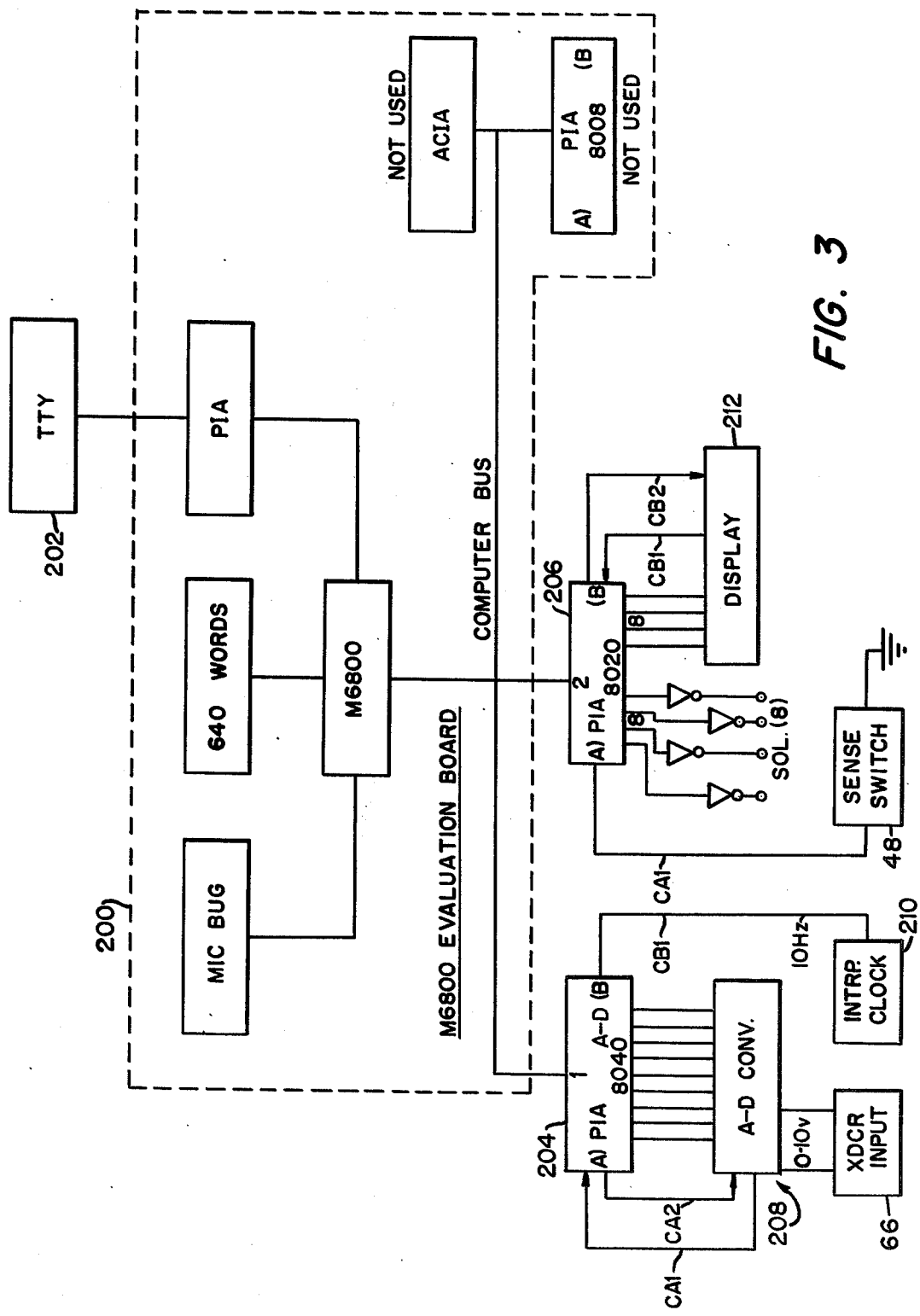
FIG. 3 is a schematic diagram of the computer of the exemplary embodiment.

Referring to FIG. 3, the computer employed in the exemplary embodiment is built around a Motorola M-

6800 microprocessor, the microprocessor M-6800, in turn, being part of a board marketed by Motorola under the designation MEK-6800 for use in breadboard development and in small microprocessor systems. The principal elements of the MEK-6800 unit are those depicted and labelled within the dashed lines designated by the reference numeral 200 in FIG. 3. As indicated in the diagram, certain components of the board 200 are not used. The board includes two peripheral interface adaptors ("PIAs"), one of which permits it to be interfaced with a teletype input-output device 202. The input-output capability of the board 200 is expanded by adding two additional peripheral interface adaptors ("PIAs") 204 and 206, the PIAs 204 and 206 being interfaced to the board 200 via the edge pin connectors of the board. Each of the two PIAs is a Motorola Model M-6820, and they are installed in the 6800 memory map to start at locations 8020 and 8040, respectively, as indicated in the diagram. Those addresses permit interfacing with the MEK-6800 board without additional address de-coding.

The computer further includes an analog/digital converter 208 for converting the analog output of the pressure transducer 66 to digital form. The analog/digital converter is a Model ADC-E made by Datel Systems, Inc., and the transducer is a Gulton Model GS47. The analog/digital converter 208 is connected to th CA1 and CA2 ports of the PIA 204 in the pulse mode.

Since the Datel A/D converter 208 is 3½ digit BCD, it requires 13 digital interface lines for the data. The A side of the PIA is interfaced to the lower two BCD digits while the B side is interfaced to the upper 1½ BCD outputs. Thus, a read of 8040 retrieves the lower two digits, and a read of 8042 retrieves the upper 1½ digits. In addition to being the measuring port, the PIA 204 has a second use; the B side is configured (using the proper control register word) to enable an interrupt request (or maskable interrupt) to the microprocessor unit 200 whenever CB1 is pulsed, A 10 Hz pulse from a pulse generator 210 is placed on this input to provide a time clock for the rod test routine of the software program (see Appendix A). This additional use of the B side of the PIA has no effect on operation of the A/D converter 208.

The second external PIA 206 (location 8020-8023) has a dual purpose. First, the A side is configured as an output and is interfaced through solid state relays (only four are diagrammed, but there are eight, as indicated) to the solenoids of the valves previously described (see FIG. 1). With this arrangement, the A data register may be loaded with the desired output word whose bit pattern corresponds to the desired state of the eight solenoids. Thus, by loading different bit patterns into location 8020, the filter rod is sequenced through the test cycle. In addition, the CA1 line is used as the sense switch (element 48) input to the computer. When CA1 is pulled to ground, bit seven in the control register (8021) will be set, indicating to the microprocessor unit that another rod is present in the transport 10 for testing.

The B side of the PIA 206 is interfaced to a 16-digit Burroughs "Panaplex" alphanumeric display 212 using the "pulse" mode of operation. This "pulse" mode uses the CB2 line to provide the "character present" line with a 1 microsecond pulse to initiate the display operation.

The Rod Test Software

The automatic rod test station software directs the sequence of the rod test cycle, converts measured values to engineering units, and displays the results on the display unit. Appendix A contains an abridged listing of the assembly language instructions in conjunction with a description of each routine in the program and a complete assembly listing of the program.

The basic tasks of the software are:
(1) Perform initialization and set up input-output (I/O) device configurations.
(2) Sequence the filter rod through the test stations, take standard, pressure drop, and circumference measurements and store these values in scratch memory locations.
(3) At completion of the rod test sequence the test values are recovered from memory.

A calculation routine converts these measurements to engineering units.
(4) The calculated results are unpacked and converted into ASCII characters, and placed into a display message.
(5) The display message is shifted one character at a time into the Panaplex display until the entire message is displayed.
(6) Scratch memory is reset and the computer goes into a wait loop, looking for the sense switch 48 to signal the start of a new test.

Among the important advantages of the rod test station are its capabilities of computing and displaying or otherwise outputting engineering values of the pressure drop and circumference virtually instantaneously, of calibrating the unit for every test (or, more precisely, correcting measured values in accordance with any drift detected in the pressure drop across the calibration standard) and of eliminating the calculating and reading errors typical of various pressure gauges and analog systems.

In particular, as more fully described in Appendix A, the computer digitizes the voltages (analog signals) produced by the transducer indicative of the pressure drops across the standard and the rod sample and in the circumference gauge. It compares the digital signal indicative of the pressure drop across the standard with an internal standard (a stored digital signal) representing the calibrated pressure drop across the standard and corrects the measured values for any error (or drift) in the measured drop in the standard. The corrected value of the pressure drop across the sample is then converted to engineering units. The computer is programmed with a formula for the calibration curve of the circumference gauge and calculates the circumference in engineering units from the digital signal of the air pressure in the circumference gauge. (The calibration measurement used in determining pressure drop is not used in calculating circumference.)

Uses of the Rod Test Station

The rod test station described herein and depicted in the drawings is entirely self-contained and can be built in such a way as to be easily installed directly on a filter-making machine. Both the measuring unit and the computer are of small size and can threfore be located where the machine operator may conveniently monitor the display as rod samples are selected and tested. Samples can be fed to the unit manually, as well as automatically, and the tests will be run and the results displayed with a few seconds. Instead of sampling automatically at a selected time interval the mechanical drive of the rod maker can be coupled to a counter and the pneumatic ejector can be controlled by the counter. The test unit can be located below the output conveyor of the maker and a simple trough installed to feed the samples to the transport of the measuring unit.

The rod test station is well suited for integration into a centralized system in which all of the rod-making machines in a plant are equipped with rod test stations and all of the stations are wired to a central computer that monitors all of the individual stations. Either the individual stations or the central system, or both, may include hardware and ancillary software for comparing on a current basis actual measurements of pressure drop and circumference of rods made on each machine with specifications, for compiling records of the quality of production on each machine and for promptly signalling (visually, audibly, or both) measurements that are outside the specifications for the products made on the machines. Regardless of whether the rod test stations are used individually (without central monitoring) on each machine or are integrated into a centrally monitored system, their use permits essentially continuous monitoring of the machine production and prompt response by the machine operator to any tendency toward out-of-limits production. Production of rods to specifications can be initiated more rapidly at machine start-ups. Substantial reductions in the loss of product through production errors, i.e., greatly improved plant efficiency, and improvements in overall product quality, are ensured. Savings derived from improved efficiency quickly cover capital outlay for the units, and the cost of the units is relatively modest in the first place; microelectronic components, particularly microprocessors, are remarkably inexpensive today and continue to drop in price.

Details of a Gauge and Transport Head

FIGS. 4 to 6 show in detail a gauge and transport head which is generally the same as the one shown schematically in FIG. 1 but which includes some modifications. the head 200 is constructed from a block 202 of metal machined to provide a pressure drop gauge bore 204 at one end, a circumference gauge bore 206 at the other end and a concave transport groove or guideway 208 between the bores.

The pressure drop gauge consists of perforated or slotted rigid sleeve 210 and a rubber diaphragm 211 (shown in its extended position in FIG. 5) which is held and sealed on the sleeve and sealed to lands in the bore by O-rings 212 to provide an annular space 214 outside the diaphragm in which a vacuum is drawn to expand the diaphragm to receive a rod sample. The line 74 (FIG. 1) is connected by a coupling 216 screwed into a hole 218 opening to the space 214.

Measurement air from the line 22 (FIG. 1) is supplied to the space within the diaphragm through a port 220 and flows through passages in a cap 222 threaded into and sealed to the bore 204. A tubular probe 224 on the cap extends partway into the diaphragm and acts as a stop to position the rod sample properly in the diaphragm and as a seal or closure at the supply end of the diaphragm, the diameter of the probe being substantially equal to that of the rod sample so that when the diaphragm relaxes and tightens on the rod sample, it also tightens on the probe and measurement air can pass only through the rod. When the diaphragm is expanded, an annular space opens between the probe and the diaphragm and allows air compressed ahed of the end of the sample as it enters the gauge to pass through that space and and out through a vent hole 226 in the block. This way of accommodating the "piston action" of an entering rod sample and ensuring that the sample fully enters the gauge to the proper position is considered a better alternative to the vacuum system described above and shown in FIG. 1, because it eliminates the "Minivac" 92, the valves 88 and 96 and some piping and wiring.

The transport air system of the head 200 consists of four sets of hole and slot passages which are the same except for orientation. Only one need be described—the structure of the others is evident from that description and the drawings. A hole 228 is drilled in the underside of the block and tapped to receive a coupling on the respective transport air line 106, 80 or 82 (see FIG. 1). Small holes 230 are drilled into the top part of the block on either side of the groove 208 at an angle to intersect the hole 228. Small slots 232 are milled into the top face of the transport section of the block on either side of the groove leading from the respective holes 228 to the groove 208 at angles (12°, for example) to the groove axis and in a direction to deliver transport air jets toward the pressure drop gauge or the circumference gauge, as the case may be. Cover plates 234 (omitted in FIG. 4 for clarity) are installed on top of the block on either side of the groove to cover the milled slots and make them into holes.

The circumference gauge bore 206 contains a die assembly 236 consisting of a cylinder having a port 240 to admit measuring air delivered through an inlet passage 242 from the line 26 (see FIG. 1) and gauge openings 244. The die assembly is held in place in the bore 206 circumferentially (to register the port and passage) by a pin 246 and axially by a retainer cap 248 which has a hole to allow ejection of the rod sample when the stop 112 is lowered (see above and FIG. 1).

The gauge and transport head 200 shown in FIGS. 4 to 6 is set up to use a rod sample sensing mode different from the one described above and shown schematically in FIG. 1. Instead of sensing the presence of a sample in place on the transport, the head has a sensing air hole 250 near the entrance end of the pressure drop gauge, thus to detect the proper insertion depth of a rod sample in the gauge. A rod in proper position in the gauge protrudes a short distance from the gauge while leaving the sensing hold 250 open; the end of a rod that is not in proper position in the gauge blocks the hole.

The software for the sensing aspect of the head 200 is different from the one described above in that the start of a test cycle is initiated by a time pulse of the computer at time 0 on the timing chart (FIG. 2). A sample ejection system (not part of the invention) on the rod maker is activated at the same time to feed a rod sample to the head. The program runs in the manner described above through sample injection into the pressure drop gauge (step 2), and at that point the computer interrogates the sensor to determine whether a sample is in proper position in the gauge. Continuance of the test cycle is held up until a sample is detected, and if one is not detected in due time, a failure signal is generated to indicate that a sample has failed to reach the gauge for test. If that occurs, it means a malfunction in the system, and an audible signal to the machine operator is desirable to call attention to the need for correction of the problem.

The two modes of sensing to initiate starting or continuing a test cycle are only representative of many possibilities. For example, the pneumatic sensing can be replaced by a photoelectric system or any equivalent means for detecting the presence of a rod sample on the transport or in the circumference gauge.

APPENDIX A

[EXPLANATORY NOTE — This Appendix A is a photocopy of a chapter of a technical report on the rod test station described and shown in the specification and FIGS. 1 to 3 of the drawings. The "Chapter 2" referred to in the report is a section (not submitted herewith) describing the Motorola M-6800 microprocessor and contains information that is publicly available by way of instruction materials relating to the M-6800. The PIA setup is described and shown in the specification and drawings. The "Chapter 3" referred to is a section describing the rod test hardware, and the subject matter of that section is contained in the specification and drawings. Certain footnotes are added for clarity. The program was written in M-6800 assembly language and then converted to machine codes using a cross assembler available on the General Electric Time Share System.]

The above tasks[1] were accomplished with the following program elements:
1. Initialization program
2. Main program
3. Interrupt handling program
4. Calculate and divide subroutine
5. Load-display and unpack subroutine
6. Answer display subroutine
7. Display-delay subroutine The machine coding for the rod test program occupies the majority of the RAM memory available in the rod test computer. Locations 0000 through 027F are utilized (FIG. 23).

[1]The "basic tasks of the software" described in the specification under the heading, "The Rod Test Software."

Initialization

The initialization program performs the PIA configuration setup and is executed only once, at start up of the program (FIG. 24).

FIGURE 23

AUTO ROD TEST PROGRAM MEMORY MAP

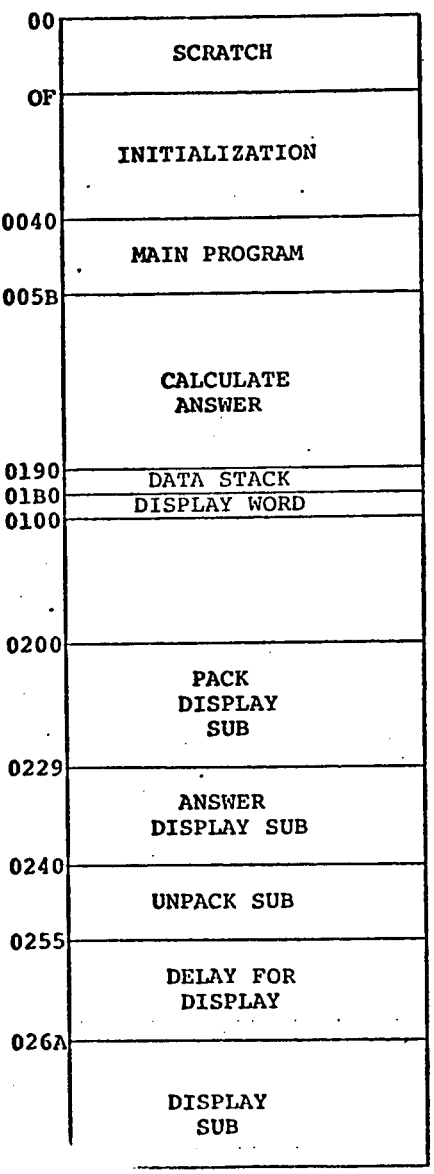

FIGURE 24

PIA INITIALIZATION BLOCK DIAGRAM

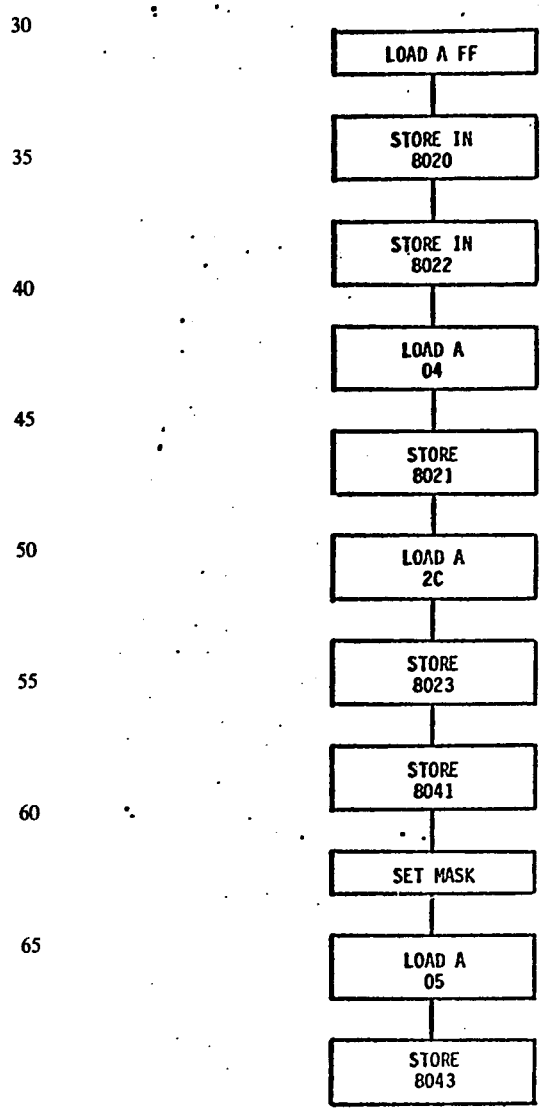

The Peripheral Interface Adaptor (PIA) requirements were discussed in chapter 3. Configuration to meet these requirements is accomplished by the initialization program by storing the correct bit pattern into the control register and the data direction register of the two interface PIA units. A detailed discussion of the PIA setup is covered in chapter 2.[2]

The required arrangement of PIA X1[3] (address 8020-8022) is an output data channel with the A side of the PIA (8020) serving as the output register for the pneumatic rod transport, and the B side is interfaced to the Burroughs Panaplex display unit.[4]

[2]Described in specification—see also FIG. 3.
[3]FIG. 3, item 206.
[4]FIG. 3, item 212.

The first step in the PIA set up is to load the data direction register with all 1's. As discussed previously in chapter 2, following reset, data written into the data register address will go to the data director register. Thus, the PIA may be set up in the output mode by writing FF into address 8020 and 8022.

| LDAA #FF | SET UP PIA FOR OUTPUT |
|---|---|
| STA A 8020 | LOAD DATA DIRECTION REGISTER (RELAY) |
| STA A 8022 | LOAD DATA DIRECTION REGISTER (DISPLAY) |

With this completed, both sides of the PIA are configured as outputs. Set up is also required for the control register. Refer to chapter 2 for details of the control register configuration. PIX X1, side A, is the parallel output. The CA1 line is used for the sense switch input[5] (not requiring interrupt). Bit 2 will be set to enable the data register, bit 0 will be cleared to mask the interrupt flag, and bit 1 will be cleared to trigger on the negative edge of CA1. Since CA2 is not used, bits 3, 4, and 5 remain cleared. The resulting control word is:

| 7 | 6 | 5 | 4 | 3 | 2 | 1 | 0 |
|---|---|---|---|---|---|---|---|
| 0 | 0 | 0 | 0 | 0 | 1 | 0 | 0 | or hex 04 stored in A control register 8021.
[5]FIGS. 1 and 3, item 48.

The configuration of the B side is for interfacing the panaplex display utilizing both CB1 and CB2 in the pulse mode (FIG. 14). This mode requires CB2 to go low on a write to the B data register and return on the next enable signal (bits 3, 4, and 5=101). Then the MPU[6] will wait, looking at the CB1 read only bit on the control register (bit 7) until the display is ready and pulls low the CB1 line. Thus, the CB1 should be in the negative logic tripping mode with masked IRQ in the MPU. CB1 is configured by loading 00 in bits 0 and 1. Finally, bit 2 is set to select the data register. The resulting control word is:

| 7 | 6 | 5 | 4 | 3 | 2 | 1 | 0 |
|---|---|---|---|---|---|---|---|
| 0 | 0 | 1 | 0 | 1 | 1 | 0 | 0 | or a hex 2C stored in the B control register 8023.

[6]The microprocessor unit (M-6800, item 200, FIG. 3).

| LDA A #04 | SET UP FOR PIA CCR |
|---|---|
| STA A 8021 | LOAD CONTROL REGISTER PIA XIa (RELAY) |
| LDA A 3 2C | |
| STA A 80 23 | LOAD CONTROL REGISTER PIA XIB (DISPLAY) |

Setup of PIX X2 (address 8040-8043)[7] is similar to the setup of X1. PIX X2 is used in conjunction with the 3½ digit BCD A/D converter[8] utilizing both the A and B side data registers (13 data lines required), with control handled by the A side.

Since both sides are to be inputs, the data direction register need not be changed. System reset loads all zeros in the data direction register, thus defining all I/O lines as inputs. The A side control lines of X2 (CA1-- CA2) are connected to the display. The CA1 line is used in the pulse mode to output a 1 μs pulse whenever the A data register is written into. This pulse is used to start the A/D conversion. The A/D signals that conversion is complete on the CA1 line. The CA1 line must be set up for negative edge tripping with the IRQ masked set. The resulting control word is:

| 7 | 6 | 5 | 4 | 3 | 2 | 1 | 0 |
|---|---|---|---|---|---|---|---|
| 0 | 0 | 1 | 0 | 1 | 1 | 0 | 0 | or a hex 2C stored in a control register 8041.
[7]FIG. 3, item 204.
[8]FIG. 3, item 208.

In addition to inputting the upper digits of the A/D converter output, the B side serves a second function. This function is for CB1 to be driven by the interrupt clock.[9] Thus the CB1 line should be configured as IRQ enabled on a negative edge trigger (bit 0 being set). CB2 is not used. The resulting control word is:

| 7 | 6 | 5 | 4 | 3 | 2 | 1 | 0 |
|---|---|---|---|---|---|---|---|
| 0 | 0 | 0 | 0 | 0 | 1 | 0 | 1 | or hex 05, which is stored in B control register location 4043.
[9]FIG. 3, item 210.

| (2C previously in the A register) | |
|---|---|
| STA A 8041 | LOAD CONTROL REGISTER PIA X2A (A/D) |
| SEI | SET MASK |
| LDA A #05 | |
| STA A 8043 | LOAD CONTROL REGISTER PIA X2B (A/D) |

Main Program

The main program is a relatively short routine which ties together the various subroutines and the interrupt routine. The main program also provides for the initialization of data registers and event counters, as well as test cycle looping (FIG. 25).

At the start of each test cycle, several addresses in the data scratch must be reset. First, the stack pointer counter must be initialized to 018F. This is accomplished by storing 01 into location 02 and 8F into location 03 (reference FIG. 26). Next, the index for A to D data storage and the interrupt counter must be cleared. This is accomplished by loading zero into 00 and 07.

FIGURE 26

| | DATA SCRATCH ASSIGNMENT |
|---|---|
| 0000 | index reg. for A/D (ADINX) |
| 0001 | |
| 0002 | data stack for interrupt (DATACK) |
| 0003 | |
| 0004 | scratch (SCRTH) |
| 0005 | offset from standard (OFFSET) |
| 0006 | |
| 0007 | count for interrupt timing (CNTR) |
| 0008 | standard data (STDT) |
| 0009 | |
| 000A | pressure drop data (PPDT) |
| 000B | |
| 000C | circ data (CRT) |
| 000D | |
| 000E | interrupt storage for stack pointer (ISSP) |
| 000F | |

FIGURE 25

MAIN PROGRAM BLOCK DIAGRAM

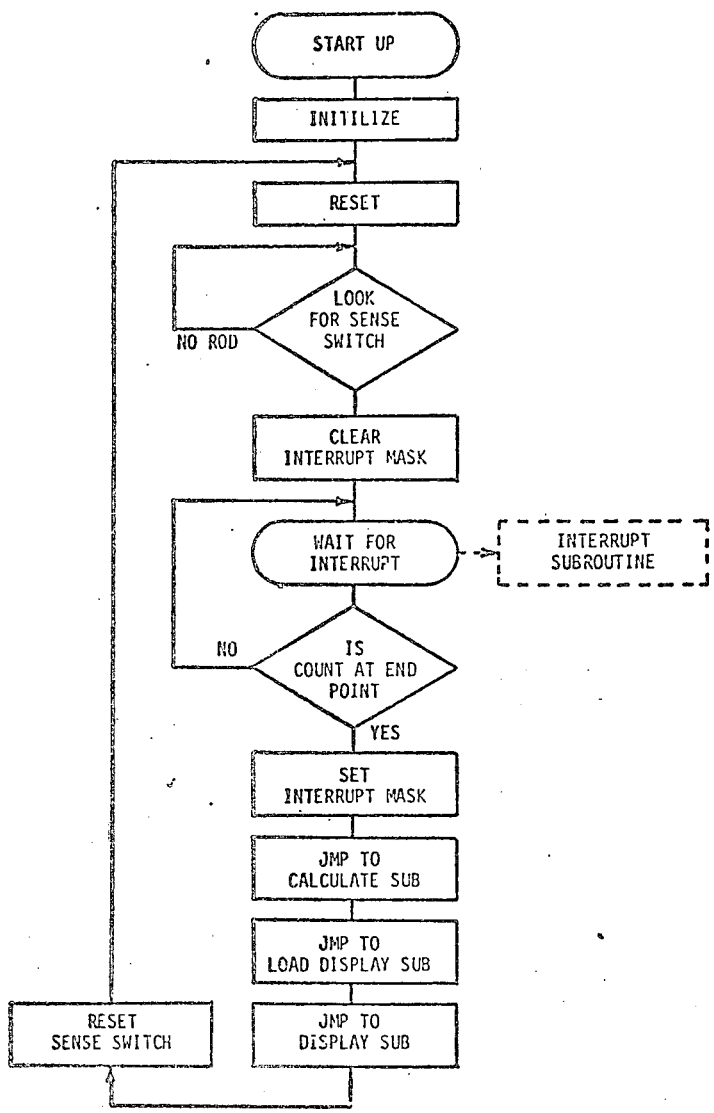

| | |
|---|---|
| LDA A #01 | |
| STA 02 | RESET STACK POINTER COUNTER UH |
| LDA A #8F | |
| STA A 03 | RESET STACK POINTER COUNTER LH |
| CLA A | |
| STA A 00 | RESET A TO D INDEX FOR DATA STORAGE 00→00 |
| STA A 07 | RESET INTERRUPT COUNTER 00→07 |

After reset, the program goes into a closed loop examining the control register of PIX X1A. This is connected through CA1 to the start sense switch. Whenever CA1 is activated, indicating a rod is present to be tested, bit 7 of the control register will be set. This highest bit set will be interrupted by the BPL (branch on plus) to be false and the program will leave the trap.

Now the test procedure is ready to start. The interrupt mask is cleared and the MPU goes into a wait for interrupt mode. As previously discussed,[10] all cycle timing is generated by a 10 Hz clock on the interrupt line. At each 0.1 second pulse the interrupt routine is entered. The interrupt routine, to be discussed in detail later, executes the tasks to be performed for that cycle, and then control is returned to the main program. The main program next examines the program count (the number of interrupt cycles) to see if the rod test steps are completed. If not, the program will branch back to the wait for interrupt instruction for the next cycle.
[10]in the specification, generally as timing.

When all tests have been performed, the interrupt mask will be set, and the main program will enter the answer process segment. The first task is to convert the measured values into engineering units. This is accomplished by a jump to the calculate subroutine.

After return from this routine, the answers are ready to be displayed. In order to display the answers, they first must be unpacked, converted to ASCII, and stored into a display message. This sequence is handled by the load display subroutine. Finally, the display word stored in memory (example PD=123 CR=56.7) is shifted into the panaplex display one character at a time using the display routine. At this point, the sense switch register (PIA X1 A) is cleared to enable the sensing of the next rod to be tested. The required registers are reset and the sense switch routine is again entered.

| | |
|---|---|
| LDA A 8021 | LOOK FOR SENSE SWITCH |
| BPL FB | BRANCH BACK UNTIL SWITCH CLOSED |
| CLI | CLEAR MASK |
| WAI | WAIT FOR INTERRUPT |
| LDA A 07 | HAVE ALL OF THE CYCLES COMPLETED YET? |
| CMPA #21 | |
| BMI F7 | NO .. BRANCH BACK |
| SEV | SET THE INTERRUPT MASK |
| JSR 0100 | JUMP TO CALCULATE SUB |
| JSR 0200 | JUMP TO LOAD DISPLAY SUB |
| JSR 022A | JUMP TO DISPLAY SUB |
| LDA A 8020 | CLEAR SENSE SWITCH PIA REGISTER |
| JMP 002B | JUMP BACK TO START FOR NEXT ROD |

Interrupt Program

The interrupt subprogram is a major section of the rod test software (FIG. 27). Every 0.1 second this routine is entered. The program stack pointer (used in the interrupt sequence) is stored and the stack pointer is loaded with the address of the interrupt data stack. In this data stack, time counts are alternated sequentially with event commands (FIG. 28).

Each time count is a number which corresponds to a target time at which an event is to occur. Each time the interrupt routine is entered (each 0.1 second) a counter is incremented (location 07), and the next target time is pulled from the stack. If the count has not yet arrived at the target time, it is not time for the event to occur. The target is then pushed back in the stack, and the interrupt routine returns control back to the main program to wait for the next interrupt to occur.

FIGURE 27

INTERRUPT SUBROUTINE BLOCK DIAGRAM

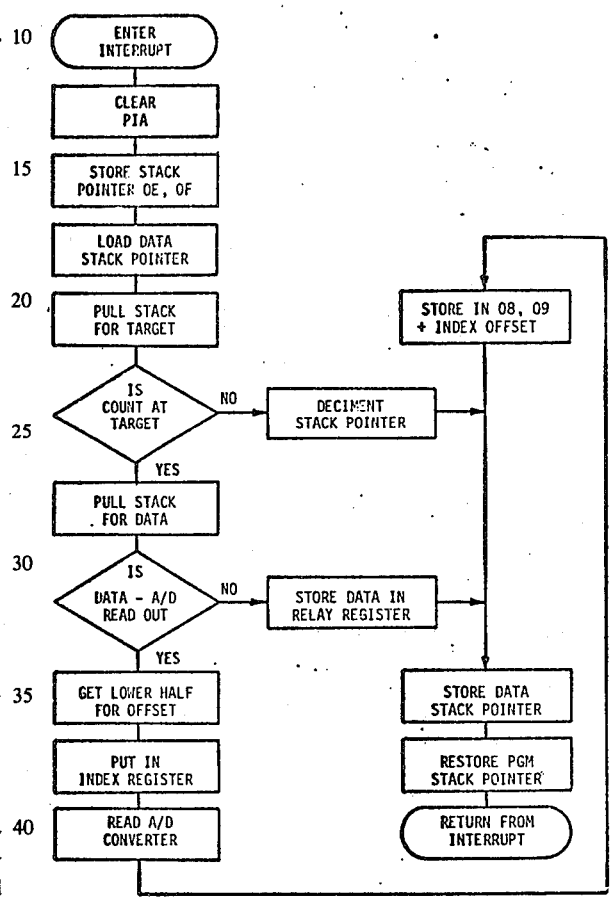

| | |
|---|---|
| LDA 8042 | CLEAR PIA WHICH INTERRUPTED |
| STS OE | STORE STACK POINTER |
| LDS 02 | LOAD DATA STACK POINTER |
| LDA B 07 | LOAD COUNT FROM LOC. 07 |
| INC B | INCREMENT COUNT |
| STA B 07 | STORE NEW COUNT |
| PULL A | GET THE TARGET COUNT FROM STACK |
| CBA | COMPARE TARGET TO COUNT |
| BNE 29 | IF COUNT NOT AT TARGET, GET OUT |

FIGURE 28

| DATA STACK ASSIGNMENT | | TARGET TIME |
|---|---|---|
| 0190 01 | | |
| 0191 F0 | READ A/D = STANDARD | COUNT 1 |
| 0192 02 | | |
| 0193 01 | OPEN DIAPHRAGM | COUNT 2 |
| 0194 04 | | |
| 0195 03 | INSERT ROD IN P.D. HEAD | COUNT 3 |
| 0196 06 | | |
| 0197 00 | TURN OFF TO SETTLE | COUNT 4 |
| 0198 08 | | |
| 0199 04 | SWITCH ON TRANSDUCER | COUNT 5 |
| 019A 10 | | |
| 0190 F2 | READ A/D = PRESSURE DROP | COUNT 6 |
| *019C 11 | | |
| 019D 19 | REMOVE ROD FROM P.D. HEAD | COUNT 7 |
| 019E 12 | | |
| 019F 19 | CONTINUE | COUNT 8 |
| 01A0 14 | | |
| 01A1 30 | TURN ON CIRC. AIR | COUNT 9 |
| 01A2 16 | | |
| 01A3 70 | SWITCH ON TRANSDUCER | COUNT 10 |
| 01A4 1D | | |
| 01A5 F4 | READ A/D = CIRCUMFERENCE | COUNT 11 |
| 01A6 1F | | |
| 01A7 90 | REMOVE ROD FROM TEST STATION | COUNT 12 |
| 01A3 21 | | |
| 01A9 00 | TURN ALL OFF TEST FINISHED | COUNT 13 |
| 01AA 22 | | |
| 01AB 00 | | COUNT 14 |
| 01AC 23 | | |
| 01AD 00 | | COUNT 15 |
| 01AE 24 | | |
| 01AF 00 | | COUNT 16 |

*Please read 019B F2

If, on the other hand, the count does equal the target time pulled from the data stack, a second "pull data" from the stack retrieves the event command. There are two types of event commands. First, if a rod movement is required, the event command will be the proper bit pattern which corresponds to the output data word to the eight air solenoids. This word is then stored in 8020, the output data register which will drive the appropriate solenoid.

If an A to D conversion is required, a special code in the command will indicate this. This code is a word equal to or greater than "F0" (an impossible output data word). Since there are three A/D operations, standard, pressure drop, and circumference, it is necessary to know which reading is being taken. This is accomplished by using the lower digit of the command word as an offset for the answer storage; i.e., an event command of F4 is an A/D conversion which would be stored in memory at plus 4 locations. Using this approach, the commands of F0, F2, and F4 store data for the standard pressure drop and circumference in 6 successive bytes of memory.

| PULL A | COUNT AT TARGET, GET DATA |
| TAB | SEE IF DATA IS AN OUTPUT OR AN A/D OPERATION |
| ADD B #10 | |
| BCC 1D | IF DATA IS OUTPUT GO TO OUTPUT DATA SECTION |
| A/D OPERATIONS | |
| AND A 07 | GET LOWER HALF OF A/D TRAP |
| STA A 01 | STORE IN 01 (INDEX REGISTER LOCATION) |
| LDX 00,01 | LOAD INDEX REGISTER FROM 00,01 |

-continued

| LDA A 8040 | GENERATE A/D STROBE |
| LDA B 8041 | SEE IF A/D CONVERSION COMPLETED |
| AND B #80 | NOT COMPLETED, GO BACK AND LOOK AGAIN |
| BEQ - 7 | |
| LDA A 8042 | A/D COMPLETED, GET UH OF DATA |
| STA X,08 | STORE IN 08 + INDEX OFFSET |
| LDA A 8040 | GET LH OF DATA |
| STA X,09 | STORE IN 09 + INDEX OFFSET |
| BRA 07 | A/D FINISHED, GET OUT |
| OUTPUT DATA | |
| COM A | FLIP DATA OVER |
| STAA 8020 | OUTPUT DATA TO REPLAY PIA |

After the event has occurred (no action, rod movement, or data gathering), the interrupt program will restore the data stack and load the interrupt vectors from the program stack pointer before returning to the main program.

| BRA 01 | OUTPUT COMPLETE, GET OUT |
| DES | NOT AT TARGET PUSH BACK STACK 1 FOR NEXT TIME |
| STS 02 | STORE DATA STACK POINTER |
| LDS | LOAD PROGRAM STACK POINTER |
| RTI | RETURN |

Answer Calculation

The answer calculation section converts the BCD voltage measurements to engineering units of millimeters of water for the pressure drop measurement, and milimeters circumference for the circumference measurement (FIG. 29). The routine also checks the calibration of the system by comparing the standard measurement against an internal constant. Any differences from this constant will be added to or subtracted from the two sample measurements before calculation.

Drift correction is accomplished by comparing the values measured from the standard against an internal constant. There are three possible results. First, the measured value may equal the constant and no correction is required.

Secondly, the measured value may be higher than the constant. If this is the case, then the system has drifted upward. To correct this, the standard value must first be subtracted from the constant. Then, the difference must be subtracted from the pressure drop and circumference readings before entering the calculation phase.

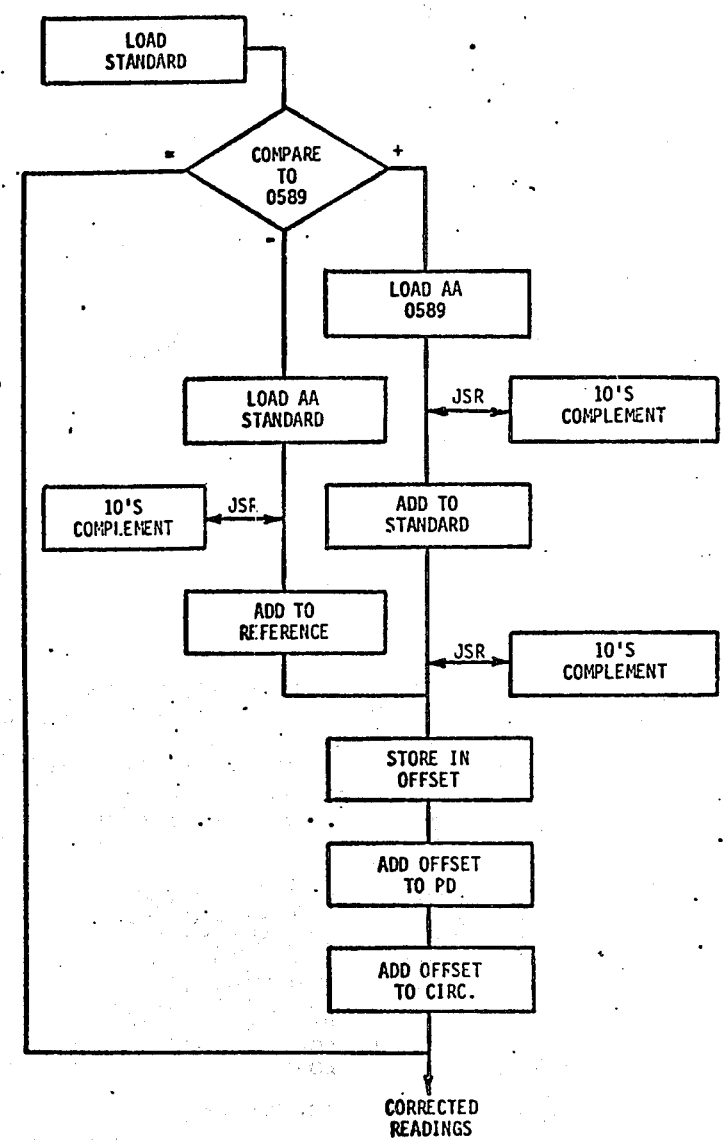

FIGURE 29

CALCULATION SUBROUTINE BLOCK DIAGRAM

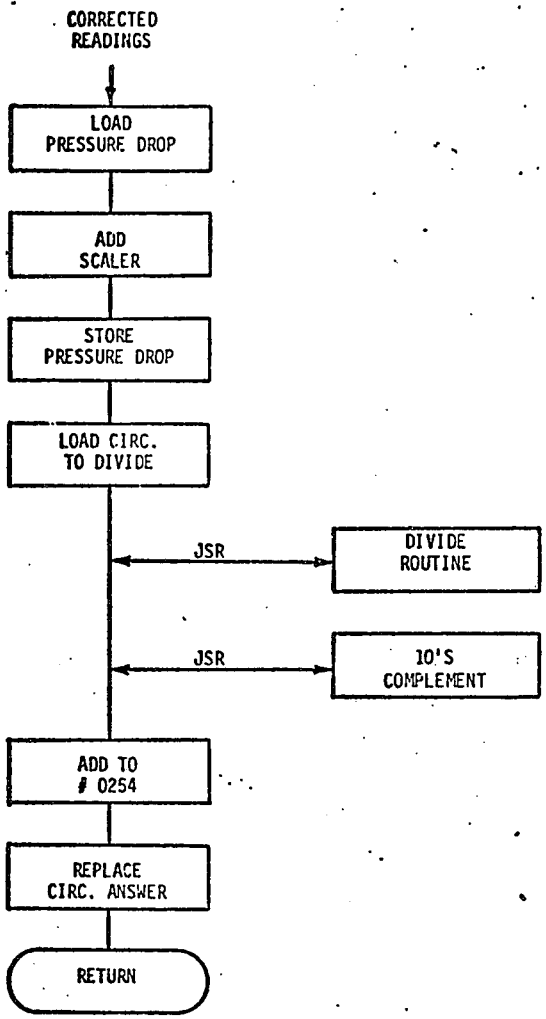

FIGURE 29 CONT.

If the comparison produces a negative result, then it is an indication that the system has drifted downward. To correct for this drift, the standard measurement is subtracted from the constant and then this difference is added to the pressure drop and circumference values.

Since the 6800 does not have BCD subtraction capabilities, subtraction was accomplished by taking the 10's complement of the subtrahend and adding this to the minuend.

Example:

$$A - B = A + (99 - B + 1) - 100$$

The 10's complement routine used for this subtraction is part of the BCD divide package required for circumference calculations. In order to use this subroutine, the number to be complemented is placed in the "AA" register (part of the divide routine) and the result is found again in "AA" (location F5 and F6).

| CALC | LDX | STDT | LOAD STANDARD MEASUREMENT |
|---|---|---|---|
| | CPX | #0589 | COMPARE TO CONSTANT |
| | BEQ | CAL | IF SAME GO TO CALCULATE |
| | BMI | MINUS | IF LESS GO TO MINUS |
| | LDX | #0589 | LOAD CONSTANT |
| | STX | AA | STORE CONTENTS IN AA |
| | JSR | D60 | JUMP 10'S COMPLEMENT |
| | LDA A | STDT + 1 | LOAD STANDARD LH IN A |
| | LDA B | STDT | LOAD STANDARD UH IN B |
| | DAA | | |
| | ADC B | AA | ADD UPPER HALF |
| | DAA | | |
| | STA A | AA + 1 | RETURN TO AA REGISTER |
| | STA B | AA | |

|       | JSR   | D60         | JUMP TO 10'S COMPLEMENT |
|-------|-------|-------------|-------------------------|
|       | LDX   | AA          | LOAD RESULTS            |
|       | STX   | OFFSET      | STORE IN OFFSET         |
|       | BRA   | ADDOFF      | GO TO ADD OFFSET        |
| MINUS | STX   | AA          | PUT STANDARD IN AA      |
|       | JSR   | D60         | JUMP TO 10'S COMPLEMENT |
|       | LDA A | #86         | LOAD A LH CONSTANT      |
|       | LDA B | #05         | LOAD B UH CONSTANT      |
|       | ADD A | AA + 1      | ADD LOWER HALF          |
|       | DAA   |             |                         |
|       | ADC B | AA          | ADD UPPER HALF          |
|       | DAA   |             |                         |
|       | STA A | OFFSET + 1  |                         |
|       | STA B | OFFSET      | STORE OFFSET            |
| ADDOFF| LDA   | PDDT + 1    | LOAD PRESSURE DROP      |
|       | LDA B | PDDT        |                         |
|       | ADD A | OFFSET + 1  | ADD A WITH OFFSET       |
|       | DAA   |             |                         |
|       | ADC B | OFFSET      | ADD B WITH OFFSET       |
|       | DAA   |             |                         |
|       | STA A | PDDT + 1    | STORE NEW PD LH         |
|       | STA B | PDDT        | STORE NEW PD UH         |
|       | LDA A | CRT + 1     | LOAD CIRC               |
|       | LDA B | CRT         |                         |
|       | ADD A | OFFSET + 1  | ADD A WITH OFFSET       |
|       | DAA   |             |                         |
|       | ADC B | OFFSET      | ADD B WITH OFFSET       |
|       | DAA   |             |                         |
|       | ADC B | OFFSET      | ADD B WITH OFFSET       |
|       | DAA   |             |                         |
|       | STA A | CRT + 1     | STORE NEW CIRCUMFERENCE |
|       | STA B | CRT         |                         |

The first calculation is the pressure drop measurement (stored in locations OA and OB). Pressure drop is the measurement of back pressure caused by the filter rod when a 17.5 cc per second flow is forced through the filter rod, as discussed in chapter 3. The relationship between the voltage measurement and millimeters of water involves the subtraction of a constant to eliminate a known offset. To simplify the coding for this routine, the 10's complement of the offset was placed into the pressure drop calculation. Thus, only a BCD addition to the constant is required to produce the desired subtraction. The new values for pressure drop are then returned to location OA and OB for display.

| CAL | LDA A | PDDT + 1 | LOAD A PRESSURE DROP LH |
|-----|-------|----------|--------------------------|
|     | LDA B | PDDT     | LOAD B PRESSURE DROP UH |
|     | ADD A | #50      | ADD COMPLEMENT OF SCALER |
|     | DAA   |          |                          |
|     | ADC B | #99      |                          |
|     | DAA   |          |                          |
|     | STA A | PDDT + 1 | RETURN SCALED PH LH      |
|     | STA B | PDDT     | RETURN SCALED PD UH      |

The second conversion, the circumference, is a more involved process. As discussed in chapter 3, this measurement is the back pressure created when air is forced between the measuring die and the filter rod. The larger the filter rod, the less space is available; therefore, the pressure measured is increased. The resulting voltage measurement (from the pressure transducer) has a nonlinear relationship to the circumference being measured.

To linearize and scale this reading with the microprocessor, a nonlinear equation was required which would satisfy this curve. Known standards were inserted into the circumference measuring head and the output voltages were recorded (FIG. 30, curve 1). This data was then loaded into a curve fit routine which provided a number of possible equations (Appendix E).[11] The best curve fit was found to be the equation:

$$\text{circumference} = 253.534 - 3518.88/X$$

which provided a 0.99 index of determination. The curve fit equation was plotted (FIG. 30, curve 2) and compared to the points measured. Since output was required over only a limited range and to only one decimal point, the above equation was simplified. Also, the values of the constants were varied for the best fit in the center of the range.

FIGURE 30

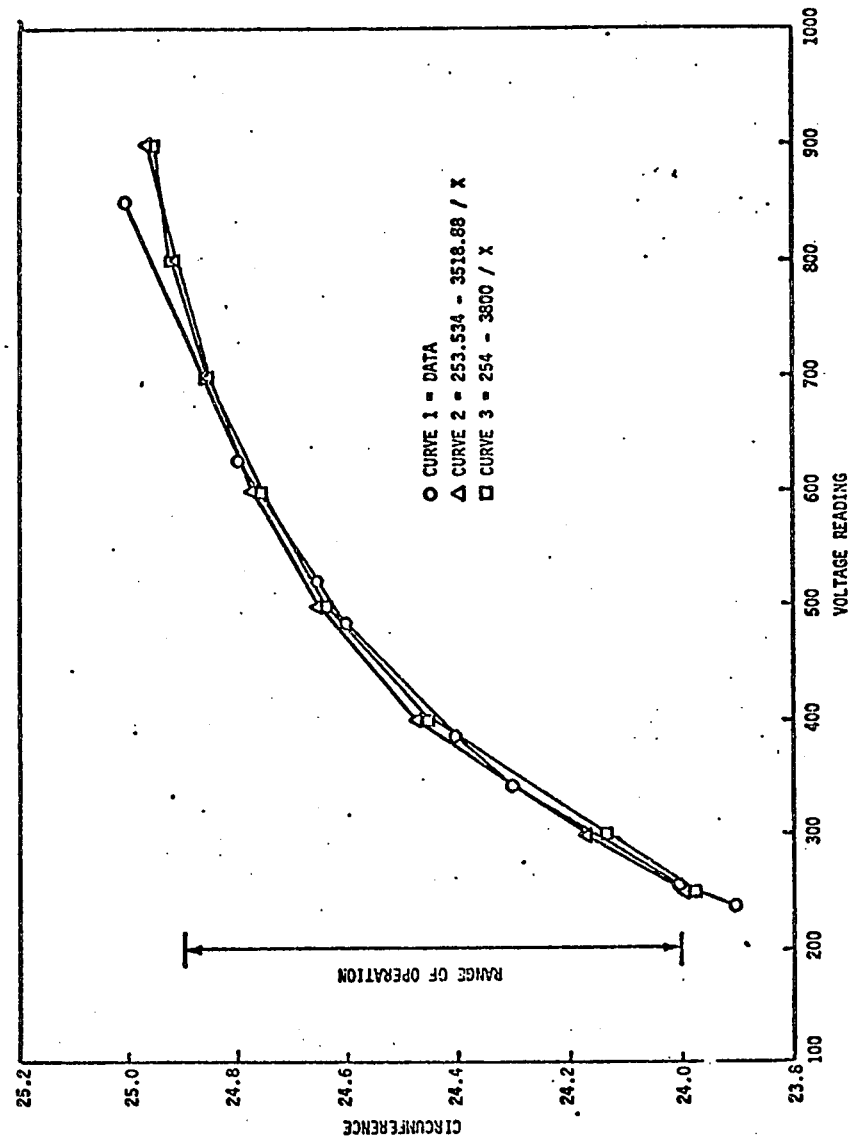

CIRCUMFERENCE CORRECTION CURVE

This simplified equation was:

circumference = 254 − 3800/X (FIG. 30, curve 3).

[11]Not included.

This simplified equation not only eliminated floating point mathematics but also required only a double precision divide routine.

Since BCD divide was an involved routine, an attempt was made to find it in existing software. The M6800 user group had a comprehensive mathpack which met the requirements for this routine, but the entire software package required 1582 bytes of memory. Since this far exceeded the available memory, the BCD divide section was slightly rewritten so it could be removed and operated independently. The resulting divide routine was trimmed to 128 bytes of program memory (Appendix D).[12] The listing for the rod test software includes this divide routine.

The first step in the circumference routine is to divide the voltage reading into the constant 3800. In order to do this the divide routine registers must be first loaded. The routine divided the number in the AA register by the number in the CC register and places the results in the DD register. Thus, the 3800 constant is loaded into AA and the circumference measurements are loaded in AA before jumping to the subroutine.

After the divide, the results must be subtracted from the offset constant 0254. Again, using 10's complement arithmetic, the results of the division were stored into the AA register, and then the 10's complement routine was jumped too. After complementing, the results were added to the 0254 constant to complete the calculations. Finally, the scaled circumference values were replaced in OC and OD for the display routine.

[12]Annexed hereto.

| | | |
|---|---|---|
| LDX | #3800 | LOAD CONSTANT IN CC |
| STX | CC | |
| LDX | CRT | LOAD CIRC READING IN AA |
| STX | AA | |
| JSR | DIVIDE | JUMP TO DIVIDE ROUTINE |
| LDX | DD | LOAD RESULT OF DIVIDE |
| STX | AA | STORE IN AA |
| JSR | D60 | JUMP TO 10'S COMPLEMENT |
| LDA A | #54 | LOAD CONSTANT FOR OFFSET |
| LDA B | #02 | |
| ADD A | AA + 1 | ADD OCNSTANT TO RESULT |
| DAA | | |
| ADD B | AA | |
| DAA | | |
| STA A | CRT + 1 | RETURN CALCULATED CIRC. |
| CRT | | |
| RTS | | |

FIGURE 31
DISPLAY WORD FOR ANSWER ASSIGNMENT

| | | |
|---|---|---|
| 01B0 50 | P | |
| 01B1 44 | D | |
| 01B2 3D | EQ (=) | |
| 01B3 33 | 3 | |
| 01B4 34 | 4 | |
| 01B5 34 | 4 | |
| 01B6 20 | SPACE | |
| 01B7 43 | C | |
| 01B8 52 | R | |
| 01B9 3D | EQ (=) | |
| 01BA 32 | 2 | |
| 01BB 34 | 4 | |
| 01BC 2E | | |
| 01BD 36 | 6 | |
| 01BE 20 | SPACE | |
| 01BF 20 | SPACE | |

Example: PD = 344 CR = 24.6

Display Routine

As discussed previously, once the results have been calclated; they are converted to individual ASCII characters, stored in a display word in memory, and then shifted one character at a time onto the alpha-numeric display unit. The display word is the ASCII codes for "DP=XXX CR=XX.X" with the results stored in the appropriate spaces for pressure drop (PD) and circumference (CR) (FIG. 31). There are four subroutines which accomplish this display task, the load display, unpack, answer display, and the display-delay routine.

The load display subroutine serves the function of loading the display word in memory with the calculated values (FIG. 32). After answer calculation, the packed (2 numbers to a word) values are located in address OA and OB for the pressure drop and OC and OD for the circumference. The load display routine retrieves the contents from each of these locations, then branches to the unpack subroutine. The unpack subroutine, to be discussed in detail later, separates the two numbers and converts them to ASCII. Now the unpack routine stores the results into the appropriate location in the display word (refer to FIG. 31).

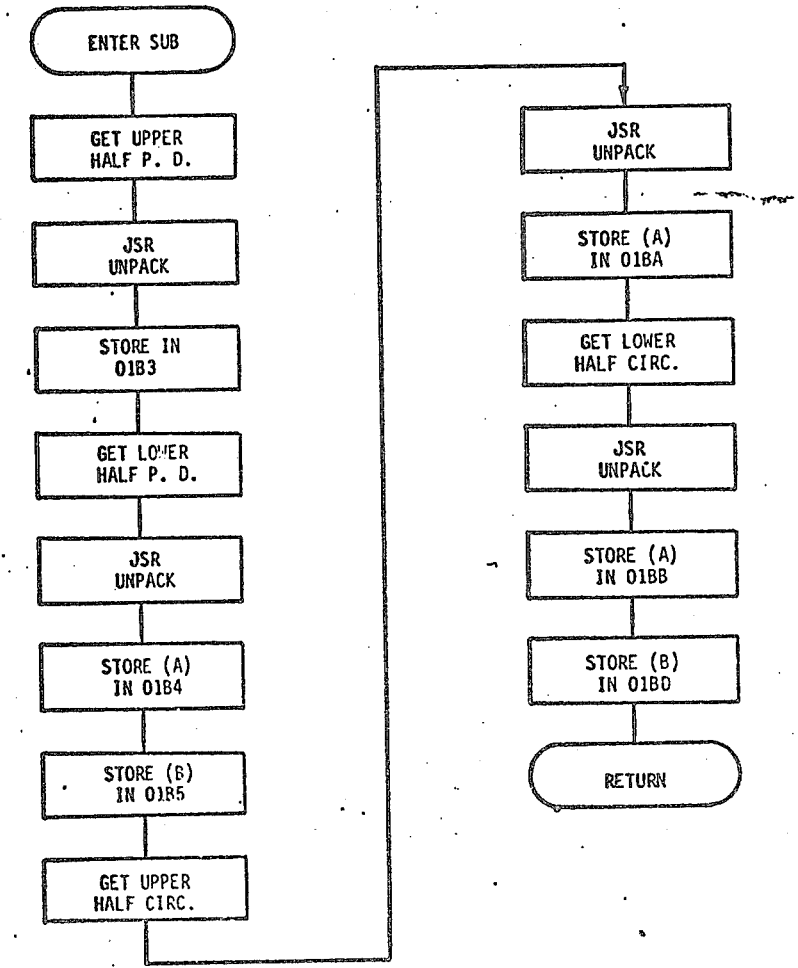

FIGURE 32
DISPLAY SUBROUTINE BLOCK DIAGRAM

| | |
|---|---|
| LDA A#QA | LOAD UPPER BYTE OF PRESSURE DROP |
| JSR 0240 | JUMP UNPACK |
| STA B 01B3 | STORED PD LH IN 01B3 |
| LDA A OB | LOAD LOWER BYTE OF PRESSURE DROP |
| LSR 0240 | JUMP UNPACK |
| STA A 01B4 | STORE PD OH IN 01B4 |
| STA B 01B5 | STORE PD LH IN 01B5 |
| LDA A OC | LOAD UPPER BYTE OF CIRCUMFERENCE |
| JSR 0240 | JUMP UNPACK |
| STA B 01BA | STORE CIRC LH IN 01BA |
| LDA A OD | LOAD LOWER BYTE OF CIRCUMFERENCE |
| JSR 0240 | JUMP UNPACK |
| STA A 01BB | STORE CIRC UH IN 01BB |
| STA B 01BD | STORE CIRC LH IN 01BD |
| RTS | RETURN |

The unpack routine is entered with the byte to be unpacked in the A register (FIG. 33). This byte is then transferred to the B registers. At this point, both the A and B register contain the byte. The A register content is masked with F0 to clear the lower one half byte and then the remaining upper bits are shifted right 4 times. This byte is then added to 30. This addition converts the BCD number to an ASCII character representing the original number. At completion of this operation, the B register is then masked with OF to clear the upper 4 bits of this byte. Again the lower 4 bits are added with 30 to convert this number to an ASCII character. Thus, at completion of the unpack subroutine, the original packed BCD number has been split and converted to ASCII with the upper number in the A register and the lower number in the B register.

FIGURE 33

UNPACK SUBROUTINE BLOCK DIAGRAM

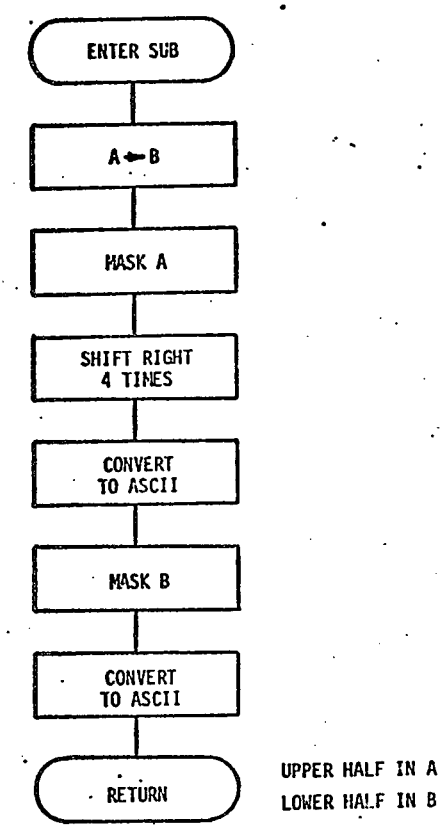

| | |
|---|---|
| TAB | A TO B |
| AND A #FO | MASK A WITH FO |
| LSRA | SHIFT FOUR TIMES |
| LSRA | |
| LSRA | |
| LSRA | |
| ADD A #30 | CONVERT TO ASCII |
| DAA | DECIMAL ADJUST |
| AND B #OF | MASK B WITH OF |
| ADD B #30 | CONVERT TO ASCII |
| DAA | DECIMAL ADJUST |
| RTS | RETURN |

At this point, the display word is loaded one character at a time into the display. The main program branches to the answer display subroutine to accomplish this task (FIG. 34). The answer display routine loads the index register with the address of the first character of the display word. Then the display is cleared of previous data. Now each character is retrieved from the display word location, using the index mode of addressing, and control jumps to the display subroutine which manipulates the PIA connected to the display to output each character. This is repeated until all of the display word characters have been outputted. At this point, control returns to the main program.

| | |
|---|---|
| LDS 01B0 | LOAD COUNT |
| JSR 026F | CLEAR DISPLAY |
| LDA X,00 | LOAD CHARACTER TO BE DISPLAYED |
| JSR 0225 | JUMP TO DISPLAY SUBROUTINE |
| INX | INCREMENT COUNT |
| CPX 01C0 | IS ALL DISPLAYED? |
| BNE F4 | NO? GET NEXT CHARACTER |
| RTS | RETURN FROM SUBROUTINE |

The display subroutine outputs each character presented by the answer display subroutine (FIG. 34). The routine has two sections. The first is a simple delay routine utilizing nested delay loops with both the A and B registers. This is necessary in order to slow down the MPU to allow for operation of the display. The display data is contained in the A register, so its contents must be saved during this operation and restored afterwards.

| | |
|---|---|
| STA A 04 | SAVE A AND B |
| STA B 05 | |
| LDA B #OF | INNER LOOP |
| LDA A #05 | OUTER LOOP |
| DEC A | |
| BNE FD | |
| DEC B | |
| BNE F8 | |
| LDA A 04 | RESTORE A AND B |
| LDA B 05 | |

The second part of te program displays the data in the A register on the display, but first the data is checked to see if it is an "OD" which corresponds to a carriage return. Whenever a CR is detected, FF is substituted into the A register.

FIGURE 34

ANSWER DISPLAY AND DISPLAY BLOCK DIAGRAM

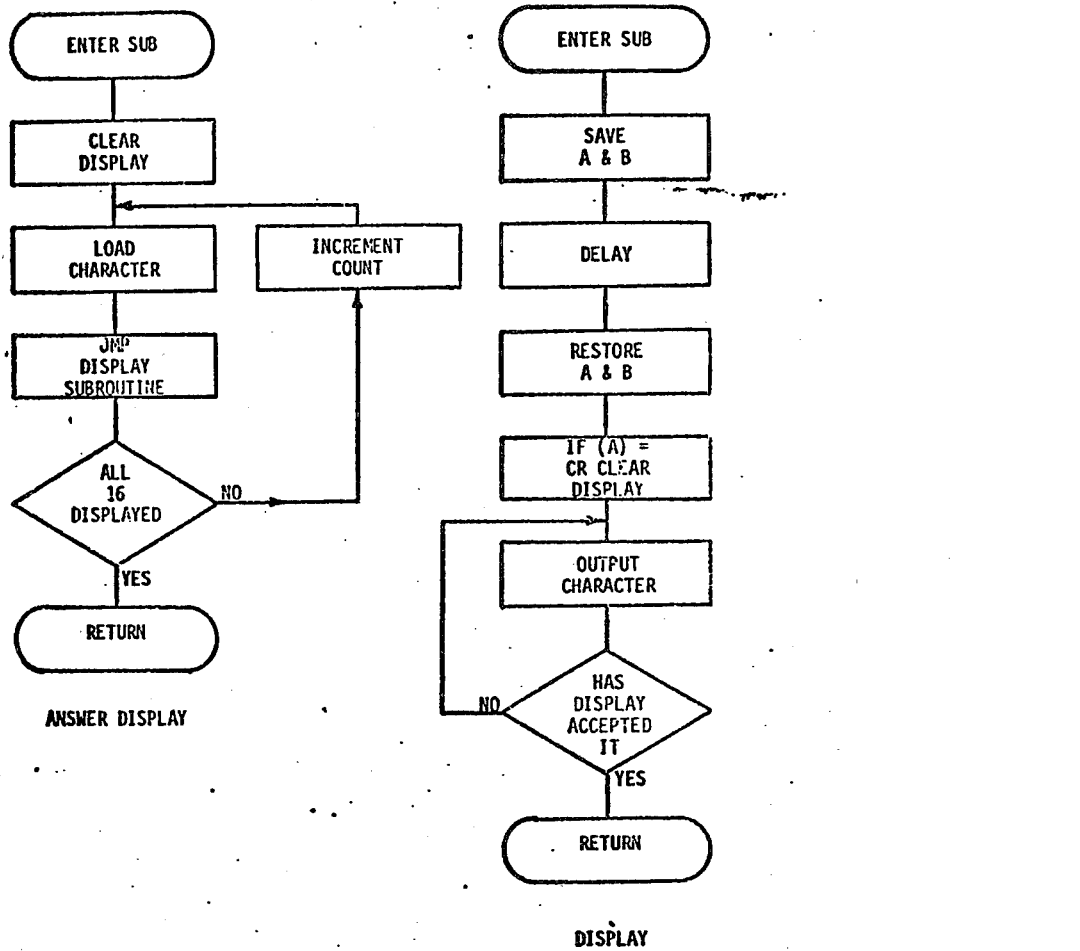

ANSWER DISPLAY

DISPLAY

Since the high bit of the PIA is connected to the display clear (see chapter 3), this will result in the blanking of the display prior to loading a new display word. At this point, the contents of the A register are stored in location 8022 (the location of the PIA data register). Then the B register is loaded with the contents of location 8023 (the location of the PIA control register). The B register is anded with 80 to mask all but the top bit of the control word (the PIA - IRQ1 bit). This is repeated until the CA1 line of the PIA is pulled low by the display indicating that the character has been displayed. Then the computer will leave this loop and return to the answer display routine for the next character to be displayed.

| | |
|---|---|
| CMP A #OD | IF A = CR, LOAD FF WHICH IS DISPLAY CLEAR |
| BNE + 02 | IF NOT SKIP |
| LDA A #FF | |
| STA A 8022 | LOAD DISPLAY WITH CHARACTER |
| LDA B 8023 | LOAD B REGISTER WITH CONTROL REGISTER |
| AND A #80 | MASK OUT ALL BUT BIT 7 |
| BEQ F9 | IF BIT NOT SET BRANCH BACK AND LOOK AGAIN |
| RTS | RETURN FROM SUBROUTINE |

APPENDIX D

```
.00100           NAM    ROOT1
 00110           OPT    M=MEMF1
 00120           OPT    O=TAPEF1
 00130           OPT    SYMBOLS
 00140  0000     ORG    $00
 00150         * MOTOROLA M6800 MICROCOMPUTER
 00160         * LORILLARD AUTO ROD TEST BREADBOARD SOFTWARE
.00170         *
 00180         *  JAMES R KNIGHTON     8/3/76
 00190         *
.00200         *THIS PROGRAM MEASURES THE CIR. AND PRESSURE DROP
 00210         *OF FILTER ROD MATERIAL AND DISPLAYS THE ANSWER
-00220         * ON A PANAPLEX DISPLAY
 00230         *
```

```
00240                  *      DATA SCRATCH 00 TO 0F
00250 0000 0001    ADINX RMB  1          INDEX REG FOR A/D OFFSET
00260 0001 0001          RMB  1
00270 0002 0001    DATACK RMB 1          DATA STACK FOR INTERRUPT
00280 0003 0001          RMB  1
00290 0004 0001    SCRTH RMB  1          DATA SCRATCH
00300 0005 0002    OFFSET RMB 2
00310 0007 0001    CNRT  RMB  1          COUNT FOR INTERRUPT
00320 0008 0001    STDT  RMB  1          STANDARD DATA
00330 0009 0001          RMB  1
00340 000A 0001    PDDT  RMB  1          PRESSURE DROP DATA
00350 000B 0001          RMB  1
00360 000C 0001    CRT   RMB  1          CIRC DATA
00370 000D 0001          RMB  1
00380 000E 0001    ISSP  RMB  1          INTERRUPT STORAGE FOR STACK
00390 000F 0001          RMB  1
00400                  *
00410 0010              ORG   $0010
00420                  * INITILIZATION
00430 0010 86 FF        LDA A #$FF        LOAD ALL 1S
00440 0012 B7 8020      STA A PX1AD       PIA X1A
00450 0015 B7 8022      STA A PX1BD       PIA X1B
00460 0018 86 04        LDA A #$04        SET UP PIA CCR
00470 001A B7 8021      STA A PX1AC       PIA X1A (RELAY)
00480 001D 86 2C        LDA A #$2C
00490 001F B7 8023      STA A PX1BC       PIA X1B
00500 0022 B7 8041      STA A PX2AC       PIA X2A (A/D)
00510 0025 0F           SEI               SET THE MASK
00520 0026 86 05        LDA A #$05
00530 0028 B7 8043      STA A PX2BC
00540                  *
00550                  * RESET SCRATCH
00560 002B 86 01  START LDA A #$01
00570 002D 97 02        STA A DATACK      01>DATA STACK UH
00580 002F 86 8F        LDA A #$8F
00590 0031 97 03        STA A DATACK+1
00600 0033 4F           CLR A
00610 0034 97 00        STA A ADINX       0>ADINX UH
00620 0036 97 07        STA A CNRT        0> INTERRUPT COUNT
00630 0038 01           FCB   $01
00640 0039              ORG   $0039
00650                  * MAIN PROGRAM
00660 0039 B6 8021 SWST LDA A PX1AC
00670 003C 2A FB        BPL   SWST
00680 003E 0E           CLI               CLEAR MASK READY FOR CLOCK
00690 003F 3E      WATI WAI
00700 0040 96 07        LDA A 07          HAS ALL CYCLES FINISHED
00710 0042 81 21        CMP A #$21
00720 0044 2B F9        BMI   WATI
00730 0046 0F           SEI
00740 0047 BD 0060      JSR   CALC        JUMP TO CALCULATE ROUTINE
00770 004A BD 0200      JSR   LOADIS      JUMP TO LOAD DISPLAY SUB
00780 004D BD 022A      JSR   ANSDPY      JUMP TO ANS DPY SUB
00790 0050 B6 8020      LDA A PX1AD       CLEAR SENSE SWITCH
00800 0053 7E 002B      JMP   START       GO BACK TO THE BEGINNING
00810 0060              ORG   $0060
00820                  *CALCULATE SUBROUTINE
00830                  *
00840 0060 DE 08   CALC LDX   STDT        LOAD STANDARD MEASUREMENT
00850 0062 8C 0589      CPX   #$0589      COMPARE TO CONSTANT
00860 0065 27 59        BEQ   CAL         IF SAME GO TO CALCULATE
00870 0067 2B 25        BMI   MINUS       IF LESS GOTO MINUS
00880 0069 CE 0589      LDX   #$0589      LOAD CONSTANT
00890 006C DF F5        STX   AA          STORE CONTENTS IN AA
00900 006E BD 0150      JSR   D60         JUMP 10'S COMPLIMENT
00910 0071 96 09        LDA A STDT+1      LOAD STANDARD LH IN A
00920 0073 D6 08        LDA B STDT        LOAD STANDARD UH IN B
00930 0075 9B F6        ADD A AA+1        ADD LOWER HALF
00940 0077 19           DAA
00950 0078 D9 F5        ADC B AA          ADD UPPER HALF
00960 007A 19           DAA
00970 007B 97 F6        STA A AA+1        RETURN TO AA REGISTER
00980 007D D7 F5        STA B AA
00990 007F BD 0150      JSR   D60         JUMP TO 10'S COMPLIMENT
01000 0082 DE F5        LDX   AA          LOAD RESULTS
01010 0084 DF 05        STX   OFFSET      STORE IN OFFSET
01020 0086 20 1C        BRA   ADDOFF      GO TO ADD OFFSET
01030 008E DF F5  MINUS STX   AA          PUT STANDARD IN AA
01040 0090 BD 0150      JSR   D60         JUMP TO 10'S COMPLIMENT
01050 0093 86 86        LDA A #$86        LOAD A LH CONSTANT
01060 0095 C6 05        LDA B #$05        LOAD B UH CONSTANT
01070 0097 9B F6        ADD A AA+1        ADD LOWER HALF
01080 0099 19           DAA
01090 009A D9 F5        ADC B AA          ADD UPPER HALF
01100 009C 19           DAA
```

```
01110 009D 97 06              STA A  OFFSET+1
01120 009F D7 05              STA B  OFFSET    STORE OFFSET
01130 00A4 96 0B    ADDOFF    LDA A  PDDT+1    LOAD PRESSURE DROP
01140 00A6 D6 0A              LDA B  PDDT
01150 00A8 9B 06              ADD A  OFFSET+1  ADD A WITH OFFSET
01160 00AA 19                 DAA
01170 00AB D9 05              ADC B  OFFSET    ADD B WITH OFFSET
01180 00AD 19                 DAA
01190 00AE 97 0B              STA A  PDDT+1    STORE NEW PD LH
01200 00B0 D7 0A              STA B  PDDT      STORE NEW PD UH
01210 00B2 96 0D              LDA A  CRT+1     LOAD CIRC
01220 00B4 D6 0C              LDA B  CRT
01230 00B6 9B 06              ADD A  OFFSET+1  ADD A WITH OFFSET
01240 00B8 19                 DAA
01250 00B9 D9 05              ADC B  OFFSET    ADD B WITH OFFSET
01260 00BB 19                 DAA
01270 00BC 97 0D              STA A  CRT+1     STORE NEW PRESSURE DROP
01280 00BE D7 0C              STA B  CRT
01290 00C0 96 0B    CAL       LDA A  PDDT+1    LOAD A PRESSURE DROP LH
01300 00C2 D6 0A              LDA B  PDDT      LOAD B PRESSURE DROP UH
01310 00C4 8B 50              ADD A  #$50      ADD COMPLIMENT OF SCALER
01320 00C6 19                 DAA
01330 00C7 C9 99              ADC B  #$99
01340 00C9 19                 DAA
01350 00CA 97 0B              STA A  PDDT+1    RETURN SCALED PD LH
01360 00CC D7 0A              STA B  PDDT      RETURN SCALED PD UH
01370 00CE CE 3800            LDX    #$3800    LOAD CONSTANT IN CC
01380 00D1 DF F9              STX    CC
01390 00D3 DE 0C              LDX    CRT       LOAD CIRC READING IN AA
01400 00D5 DF F5              STX    AA
01410 00D7 BD 00FF            JSR    DIVIDE    JUMP TO DIVIDE ROUTINE
01420 00DA DE FB              LDX    DD        LOAD RESULT OF DIVIDE
01430 00DC DF F5              STX    AA        STORE IN AA
01440 00DE BD 0150            JSR    D60       JUMP TO 10'S COMPLIMENT
01450 00E1 86 54              LDA A  #$54      LOAD CONSTANT FOR OFFSET
01460 00E3 C6 02              LDA B  #$02
01470 00E5 9B F6              ADD A  AA+1      ADD CONSTANT TO RESULT
01480 00E7 19                 DAA
01490 00E8 DB F5              ADD B  AA
01500 00EA 19                 DAA
01510 00EB 97 0D              STA A  CRT+1     RETURN CALCULATED CIRC.
01520 00ED D7 0C              STA B  CRT
01525 00EF 39                 RTS
01530 00F0                    ORG    $00F0
01540                    *
01550                    *BCD DIVIDE SUBROUTINE
01560                    *
01570 00F0 0004    CONST     RMB    4
01580 00F4 0001    CNTR      RMB    1         COUNTER
01590 00F5 0002    AA        RMB    2         AA REGISTER FOR DIVIDE
01600 00F7 0002    BB        RMB    2         BB REGISTER FOR DIVIDE
01610 00F9 0002    CC        RMB    2         CC REGISTER FOR DIVIDE
01620 00FB 0002    DD        RMB    2         DD REGISTER FOR DIVIDE
01630 00FD 0002    EE        RMB    2         EE REGISTER FOR DIVIDE
01640 00FF DE FD   DIVIDE    LDX    EE
01650 0101 C6 04             LDA B  #$04      CLEAR DD AND EE REGISTERS
01660 0103 4F                CLR A
01670 0104 09      D04       DEX
01680 0105 A7 02             STA A  02,X
01690 0107 5A                DEC B
01700 0108 26 FA             BNE    D04
01710 010A C6 02             LDA B  #$02
01720 010C 09      D08       DEX                CLEAR BB REGISTER
01730 010D A7 00             STA A  0,X
01740 010F 5A                DEC B
01750 0110 26 FA             BNE    D08
01760 0112 7F 00F4           CLR    AA-1
01770 0115 86 04             LDA A  #$04
01780 0117 C6 03   D12       LDA B  #$03      SHIFT REGISTER LEFT 4 BITS
01790 0119 DE F7             LDX    BB
01800 011B 0C                CLC
01810 011C 09      D16       DEX
01820 011D 69 00             ROL    0,X
01830 011F 5A                DEC B
01840 0120 26 FA             BNE    D16
01850 0122 4A                DEC A
01860 0123 26 F2             BNE    D12
01870 0125 86 08             LDA A  #$08      INITIALIZE SHIFT
01880 0127 97 F4             STA A  CNTR      COUNTER
01890 0129 8D 25   D20       BSR    D60       JUMP TO 10'S COMP OF AA
01900 012B 8D 40   D24       BSR    D72       ADD AA + BB REGISTERS
01910 012D 24 05             BCC    D28       TOO MUCH
01920 012F 7C 00FF           INC    EE+2      ADD 1 TO NUMBER
01930 0132 20 F7             BRA    D24
01940 0134 8D 1A   D28       BSR    D60       JUMP TO 10'S COMPLIMENT
```

```
01950 0136 7A 00F4           DEC     CNTR
01960 0139 27 14             BEQ     D40         OPERATIONS FINISHED
01970 013B 8D 30             BSR     D72
01980 013D 86 04             LDA A   #$04        SHIFT BB,CC,DD,EE
01990 013F C6 08      D32    LDA B   #$08        REGISTERS LEFT 4 BITS
02000 0141 DE FD             LDX     EE
02010 0143 0C               CLC
02020 0144 09       D36    DEX
02030 0145 69 02             ROL     2,X
02040 0147 5A               DEC B
02050 0148 26 FA             BNE     D36
02060 014A 4A               DEC A
02070 014B 26 F2             BNE     D32
02080 014D 20 DA             BRA.    D20
02090 014F 39       D40    RTS
02100                *
02110                *COMPLIMENT ROUTINE
02120                *
02130 0150 C6 03    D60    LDA B   #$03        10'S COMPLIMENT OF AA
02140 0152 DE F4            LDX     .JA-1
02150 0154 86 99    D64    LDA A   #$99        9'S COMPLIMENT
02160 0156 A0 00            SUB A   0,X
02170 0158 A7 00            STA A   0,X
02180 015A 08              INX
02190 015B 5A              DEC B
02200 015C 26 F6            BNE     D64
02210 015E 0D              SEC                 10'S COMPLIMENT (9'S +1)
02220 015F C6 03            LDA B   #$03
02230 0161 09     D68    DEX
02240 0162 86 00            LDA A   #$00
02250 0164 A9 00            ADC A   0,X
02260 0166 19              DAA
02270 0167 A7 00            STA A   0,X
02280 0169 5A              DEC B
02290 016A 26 F5            BNE     D68
02300 016C 39              RTS                 RETURN COMPLIMENT FINISHED
02310 016D C6 03    D72    LDA B   #$03        ADD AA AND BB REGISTERS
02320 016F DE FB            LDX     DD
02330 0171 0C              CLC
02340 0172 09     D76    DEX
02350 0173 A6 00            LDA A   0,X
02360 0175 A9 03            ADC A   3,X
02370 0177 19              DAA
02380 0178 A7 03            STA A   03,X
02390 017A 5A              DEC B
02400 017B 26 F5            BNE     D76
02410 017D 39              RTS
02440                *
02450                * STACK FOR ROD MOVEMENT TIMING
02460 0190              ORG     $0190
02470 0190 01F0   CNT01  FDB     $01F0       READ A/D FOR STANDARD
02480 0192 0201   CNT02  FDB     $0201
02490 0194 0403   CNT03  FDB     $0403
02500 0196 0600   CNT04  FDB     $0600
02510 0198 0804   CNT05  FDB     $0804
02520 019A 10F2   CNT06  FDB     $10F2       READ A/D FOR P.D.
02530 019C 1119   CNT07  FDB     $1119
02540 019E 1219   CNT08  FDB     $1219
02550 01A0 1430   CNT09  FDB     $1430
02560 01A2 1670   CNT10  FDB     $1670
02570 01A4 1DF4   CNT11  FDB     $1DF4       READ A/D FOR CIRC.
02580 01A6 1E90   CNT12  FDB     $1E90
02590 01A8 2100   CNT13  FDB     $2100
02600 01AA 2200   CNT14  FDB     $2200
02610 01AC 2300   CNT15  FDB     $2300
02620 01AE 2400   CNT16  FDB     $2400
02630 01B0              ORG     $01B0
02640                *
02650                * DISPLAY WORD IN ASCII
02660 01B0 50    DISPWD FCC     /PD=000 CR=00.0 /
      01B1 44
      01B2 3D
      01B3 30
      01B4 30
      01B5 30
      01B6 20
      01B7 43
      01B8 52
      01B9 3D
      01BA 30
      01BB 30
      01BC 2E
      01BD 30
      01BE 20
      01BF 20
```

```
02670                        *INTERRUPT SUBROUTINE
02680 0100                        ORG      $0100
02690 0100 B6 8042  INTRPT    LDA A   PX2BD      CLEAR PIA WHICH INTERRUPTED
02700 0103 9F 0E              STS     ISSP       STORE STACK POINTER
02710 0105 9E 02              LDS     DATACK     LOAD DATA STACK POINTER
02720 0107 D6 07              LDA B   CNRT       LOAD COUNT
02730 0109 5C                 INC B              INCREMENT COUNT
02740 010A D7 07              STA B   CNRT       STORE NEW COUNT
02750 010C 32                 PUL A              GET THE TARGET COUNT
02760 010D 11                 CBA                COMPARE TARGET TO COUNT
02770 010E 26 28              BNE     XTIME      IF COUNT NOT AT TARGET, GET
02780 0110 32                 PUL A                                      OUT
02790 0111 16                 TAB
02800 0112 CB 10              ADD B   #$10       SEE IF DATA IS A/D OR OUTPU
02810 0114 24 1C              BCC     OUTDTA     DATA IS OUTPUT GO TO OUTDTA
02820                     *   A/D OPERATIONS
02830 0116 84 07              AND A   #$07       MASK FOR LOWER HALF
02840 0118 97 01              STA A   ADINX+1    STORE IN 01
02850 011A DE 00              LDX     ADINX      LOAD INDEX REGISTER FROM 01
02860 011C B6 8040            LDA A   PX2AD      GENERATE A/D STROBE
02870 011F F6 8041  ADRDY     LDA B   PX2AC      SEE IF A/D CONVERSION COMP
02880 0122 C4 80              AND B   #$80       NO? GO BACK
02890 0124 27 F9              BEQ     ADRDY      YES GO AHEAD
02900 0126 B6 8042            LDA A   PX2BD      GET UH OF DATA
02910 0129 A7 08              STA A   STDT,X     STORE IN 08+ INDEX OFFSET
02920 012B B6 8040            LDA A   PX2AD      GET LH OF DATA
02930 012E A7 09              STA A   STDT+1,X   STORE IN 09 + INDEX
02940 0130 20 07              BRA     OUTSB      A/D FINISHED, GET OUT
02950                     *   OUTPUT DATA ROUTINE
02960 0132 43     OUTDTA      COM A              FLIP DATA OVER
02970 0133 B7 8020            STA A   PX1AD      OUTPUT TO DATA RELAY
02980 0136 20 01              BRA     OUTSB      OUTPUT FINISHED GET OUT
02990 0138 34     XTIME       DES
03000 0139 9F 02  OUTSB       STS     DATACK     STORE DATA POINTER
03010 013B 9E 0E              LDS     ISSP       LOAD PROGRAM STACK POINTER
03020 013D 3B                 RTI                RETURN FROM INTERRUPT SUB
03030                     *   LOAD DISPLAY SUB
03040 0200                    ORG     $0200
03050 0200 96 0A  LOADIS      LDA A   PDDT
03060 0202 BD 0240            JSR     UNPACK
03070 0205 F7 01B3            STA B   $01B3      STORE PD UH
03080 0208 96 0B              LDA A   PDDT+1
03090 020A BD 0240            JSR     UNPACK
03100 020D B7 01B4            STA A   $01B4      STORE PD LH
03110 0210 F7 01B5            STA B   $01B5
03120 0213 96 CC              LDA A   CRT
03130 0215 BD 0240            JSR     UNPACK
03140 0218 F7 01BA            STA B   $01BA      STORE CIR UH
03150 021B 96 0D              LDA A   CRT+1
03160 021D BD 0240            JSR     UNPACK
03170 0220 B7 01BB            STA A   $01BB      STORE CIRC LH
03180 0223 F7 01BD            STA B   $01BD
03190 0226 39                 RTS
03200                     *ANSWER DISPLAY SUBROUTINE
03210 022A                    ORG     $022A
03220 022A CE 01B0 ANSDPY     LDX     #$01B0     LOAD COUNT
03230 022D BD 026B            JSR     CLRD       CLEAR DISPLAY
03240 0230 A6 00  XCHAR       LDA A   00,X       LOAD CHARACTOR
03250 0232 BD 0255            JSR     DISP
03260 0235 08                 INX                INCREMENT COUNT
03270 0236 8C 01C0            CPX     #$01C0
03280 0239 26 F5              BNE     XCHAR      NO, GT NEXT CHAR.
03290 023B 39                 RTS
03300                     *   UNPACK SUBROUTINE
03310 0240                    ORG     $0240
03320 0240 16     UNPACK      TAB
03330 0241 84 F0              AND A   #$F0       MASK A WITH F0
03340 0243 44                 LSR A              SHIFT FOUR TIMES
03350 0244 44                 LSR A
03360 0245 44                 LSR A
03370 0246 44                 LSR A
03380 0247 8B 30              ADD A   #$30       CONVERT TO ASCII
03390 0249 19                 DAA
03400 024A C4 0F              AND B   #$0F       MASK B WITH 0F
03410 024C CB 30              ADD B   #$30       CONVERT TO ASCII
03420 024E 19                 DAA
03430 024F 39                 RTS
03440                     *   DISPLAY SUBROUTINE
03450 0255                    ORG     $0255
03460 0255 97 04  DISP        STA A   SCRTH      SAVE A
03470 0257 D7 05              STA B   SCRTH+1    SAVE B
03480 0259 C6 0F              LDA B   #$0F
03490 025B 86 00  OTLOOP      LDA A   #$00
03500 025D 4A     INLOOP      DEC A
03510 025E 26 FD              BNE     INLOOP
```

```
03520 0260 5A              DEC B
03530 0261 26 F8            BNE     OTLOOP
03540 0263 96 04             LDA A   SCRTH     RESTORE A
03550 0265 D6 05             LDA B   SCRTH+1   RESTORE B
03560 0267 81 0D             CMP A   #$0D
03570 0269 26 02             BNE     CHAR      IF A=CR, LOAD FF TO CLEAR D
03580 026B 86 FF    CLRD     LDA A   #$FF
03590 026D B7 8022  CHAR     STA A   PX1BD     LOAD DISPLAY
03600 0270 F6 8023  DREADY   LDA B   PX1BC
03610 0273 C4 80             AND B   #$80
03620 0275 27 F9             BEQ     DREADY    IF NOT READY GO BACK
03630 0277 39               .RTS
03640                       *
03650                       * END OF PROGRAM
03660                       *
03670                       * PIA ASSIGNMENTS
03680      8040    PX2AD    EQU     $8040
03690      8041    PX2AC    EQU     $8041
03700      8042    PX2BD    EQU     $8042
03710      8043    PX2BC    EQU     $8043
03720      8020    PX1AD    EQU     $8020
03730      8021    PX1AC    EQU     $8021
03740      8022    PX1BD    EQU     $8022
03750      8023    PX1BC    EQU     $8023
03760 :                     END
```

SYMBOL TABLE

```
AA      00F5  ADDOFF  00A4  ADINX   0000  ADRDY   011F  ANSDPY  022A
BB      00F7  CAL     00C0  CALC    0060  CC      00F9  CHAR    026D
CLRD    026B  CHRT    0007  CNTO1   0190  CNTO2   0192  CNTO3   0194
CNTO4   0196  CNTO5   0198  CNTO6   019A  CNTO7   019C  CNTO8   019E
CNTO9   01A0  CNT10   01A2  CNT11   01A4  CNT12   01A6  CNT13   01A8
CNT14   01AA  CNT15   01AC  CNT16   01AE  CNTR    00F4  CONST   00F0
CRT     000C  D04     0104  D08     010C  D12     0117  D16     011C
D20     0129  D24     012B  D28     0134  D32     013F  D36     0144
D40     014F  D60     0150  D64     0154  D68     0161  D72     0169
D76     0172  DATACK  0002  DD      00FB  DISP    0255  DISPWD  0180
DIVIDE  00FF  DREADY  0270  EE      00FD  INLOOP  025D  INTRPT  0100
ISSP    000E  LOADIS  0200  MINUS   008E  OFFSET  0005  OTLOOP  025B
OUTDTA  0132  OUTSB   0139  PRDT    000A  PX1AC   8021  PX1AD   8020
PX1BC   8023  PX1BD   8022  PX2AC   8041  PX2AD   8040  PX2BC   8043
PX2BD   8042  SCRTH   0004  START   002B  STDT    0008  SWST    0039
UNPACK  0240  WAIT    003F  XCHAR   0230  XTIME   0138
```

TOTAL ERRORS  0

I claim:

1. Apparatus for measuring the pressure drop through a filter rod for cigarette filters or the like comprising a pressure drop gauge including a chamber open at one end to receive a filter rod and adapted to be closed at the other end to contain a gas under pressure in communication with one end of a filter rod received in the chamber and having a diaphragm selectively engageable with the peripheral surface of a filter rod received therein, a calibration standard, a source of gas at a substantially constant flow rate, means for conducting gas from the source to the calibration standard and the pressure drop gauge sequentially in a selected order, pressure transducer means for producing an electrical signal indicative of a gas pressure, means for selectively connecting the pressure transducer means to the gas source, and control means including means for automatically controlling the conduction of gas from the source to the calibration standard, the pressure drop gauge and the transducer means to provide sequentially in a selected order (a) a signal indicative of the pressure drop across the standard and (b) a signal indicative of the pressure drop across a filter rod in the pressure drop gauge.

2. Apparatus according to claim 1 and further comprising a transport receptacle adjacent the open end of the chamber of the pressure drop gauge for receiving a filter rod preparatory to introducing it into the chamber, and means for moving a filter rod from the receptacle into the chamber in response to a signal from said control means.

3. Apparatus according to claim 2 and further comprising sensor means for detecting the presence of a filter rod in the receptacle and means responsive to the sensor means for initiating operation of the control means to cause the filter rod to be moved by said moving means from the receptacle into the chamber.

4. Apparatus according to claim 2 and further comprising sensor means for detecting the presence of a filter rod in the pressure drop gauge and generating a signal indicative thereof, and means responsive to a signal from the sensor means for initiating operation of the control means to cause gas to be conducted from the source to the pressure drop gauge and pressure transducer.

5. Apparatus according to claim 1 and further comprising vacuum-generating means for producing in a gas a pressure below atmospheric pressure, and means for selectively connecting said vacuum-generating means to the closed end of the chamber of the pressure drop gauge in response to a signal from the control means to facilitate reception of a filter rod in the chamber in a predetermined position.

6. Apparatus according to claim 1 wherein the pressure drop gauge chamber includes a vent hole and means for selectively establishing a path for conduction of air from the space within the diaphragm to the vent hole, thus to vent air pushed ahead of a filter rod as it enters the space.

7. Apparatus according to claim 6 wherein the pressure drop gauge includes a probe extending partway into the said other end of the diaphragm and wherein the path is defined between the probe and the diaphragm upon expansion of the diaphragm to receive a filter rod.

8. Apparatus according to claim 1 wherein the end of the probe within the diaphragm defines a stop for positioning a filter rod in a predetermined position within the pressure drop gauge.

9. Apparatus according to claim 1, wherein the pressure transducer means produces analog signals and further comprising means for converting the analog signals produced by the transducer means to digital form and computer means for processing the digital signals from the converting means and computing therefrom the pressure drop across a filter rod in the pressure drop gauge from the digital signals indicative of the pressure drop across said filter rod corrected for any drift in digital signals indicative of the pressure drop across the calibration standard from a predetermined value.

10. Apparatus according to claim 9, wherein the computer means includes means for producing a digital signal representing an internal constant indicative of a calibrated value of the pressure drop across the calibration standard, for comparing a digital signal indicative of the pressure drop across the calibration standard produced by the analog-digital converting means to the digital signal representing the internal constant, for producing an error signal indicative of any difference between said signals and for correcting digital signals produced by the analog-digital converting means indicative of the pressure drop across a filter rod in the pressure drop gauge in accordance with said error signal.

11. Apparatus according to claim 1 and further comprising, for measuring the circumference of a filter rod, a circumference gauge including a die for receiving a filter rod and defining an annular space between the die and the filter rod, a source of gas under at substantially constant pressure above ambient pressure, means for conducting gas from the source to the annular space, and means for selectively connecting the transducer means to the annular space, and wherein the control means includes means for automatically establishing simultaneous conduction of gas from the source to the circumference gauge and the transducer such that the transducer produces a signal indicative of the circumference of a filter rod in the circumference gauge.

12. Apparatus according to claim 11 wherein the pressure transducer means produces analog signals, and further comprising means for converting the analog signals produced by the transducer means to digital form and computer means for storing information indicative of a calibration curve of the circumference gauge and for calculating engineering values of circumference of rod samples from the digital form signals indicative of circumference and the calibration curve information.

13. A method of measuring the pressure drop through a filter rod for cigarette filters or the like comprising the steps of conducting a gas at a substantially constant flow rate through a calibration standard, detecting the drop in gas pressure across the calibration standard, detecting the drop in gas pressure across the calibration standard by means of a pressure transducer, producing a digital signal indicative of the gas pressure drop across the calibration standard detected by the pressure transducer, conducting the gas at said substantially constant flow rate through a filter rod, detecting by means of said pressure transducer the pressure drop across the filter rod, producing a digital signal indicative of the pressure drop across the filter rod detected by the pressure transducer, producing a digital signal representing an internal constant indicative of a calibrated pressure drop across the calibration standard, comparing the calibrated pressure drop signal and the measured pressure drop signal and producing an error signal indicative of any difference between them, and correcting the signal indicative of the pressure drop across the filter rod in accordance with any such error signal.

14. A method according to claim 13 and further comprising the step of processing the signals indicative of the pressure drop through the filter rod as corrected for any error to produce an output signal indicative of the pressure drop through the filter rod in engineering units.

15. A method of measuring the pressure drop through and circumference of a filter rod for cigarette filters or the like comprising the steps of conducting a gas from a supply of gas at a substantially constant pressure above ambient pressure through a calibration standard at a substantially constant flow rate, detecting the pressure drop across the calibration standard by means of a pressure transducer, producing a digital signal indicative of the pressure drop across the calibration standard detected by the pressure transducer, generating a digital signal representing an internal constant indicative of a calibrated pressure drop across the calibration standard, comparing the detected pressure drop signal and the calibrated pressure drop signal and producing a digital signal indicative of any difference between them, conducting gas from the supply at a substantially constant flow rate through a filter rod, detecting by means of said pressure transducer the pressure drop across the filter rod, producing a digital signal indicative of said pressure drop across the filter rod detected by the pressure transducer, correcting the pressure drop signal in accordance with any error signal, conducting gas from the supply at a substantially constant pressure through an annular passage between the filter rod and a calibrated circumference gauge die, detecting by means of said pressure transducer the pressure drop in said annular passage, producing a digital signal indicative of the pressure drop through said passage detected by the pressure transducer, and processing the signal indicative of the pressure drop through said passage and signals representing a calibration curve for the circumference gauge to generate a signal representing an engineering value of the circumference.

* * * * *